(12) United States Patent
Harada et al.

(10) Patent No.: US 10,096,823 B2
(45) Date of Patent: Oct. 9, 2018

(54) ELECTRODE MATERIAL, NONAQUEOUS ELECTROLYTE BATTERY, BATTERY PACK, AND VEHICLE

(71) Applicant: Kabushiki Kaisha Toshiba, Minato-ku (JP)

(72) Inventors: Yasuhiro Harada, Isehara (JP); Norio Takami, Yokohama (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 67 days.

(21) Appl. No.: 15/259,234

(22) Filed: Sep. 8, 2016

(65) Prior Publication Data

US 2016/0380267 A1    Dec. 29, 2016

Related U.S. Application Data

(63) Continuation of application No. PCT/JP2014/057566, filed on Mar. 19, 2014.

(51) Int. Cl.
*H01M 4/36* (2006.01)
*H01M 4/485* (2010.01)
(Continued)

(52) U.S. Cl.
CPC .......... *H01M 4/366* (2013.01); *C01G 23/003* (2013.01); *C01G 23/005* (2013.01);
(Continued)

(58) Field of Classification Search
CPC ........... H01M 10/0525; H01M 10/425; H01M 2004/027; H01M 2220/20; H01M 4/366;
(Continued)

(56) References Cited

U.S. PATENT DOCUMENTS

| 5,545,468 A | 8/1996 | Koshiba et al. |
| 2009/0042095 A1 | 2/2009 | Inagaki et al. |

(Continued)

FOREIGN PATENT DOCUMENTS

| CN | 102272988 | 12/2011 |
| JP | 6-275263 A | 9/1994 |

(Continued)

OTHER PUBLICATIONS

International Search Report dated Jun. 24, 2014 in PCT/JP2014/057566 filed Mar. 19, 2014 (with English translation).

(Continued)

*Primary Examiner* — Carlos Barcena
(74) *Attorney, Agent, or Firm* — Oblon, McClelland, Maier & Neustadt, L.L.P.

(57) ABSTRACT

According to one embodiment, an electrode material is provided. The electrode material includes active material particles. The active material particle includes a phase of a monoclinic titanium dioxide and a phase of the spinel type lithium titanate. The active material particle includes a shell part and a core part surrounded by the shell part. The shell part is formed by dispersing at least a part of the phase of the spinel type lithium titanate on the active material particle. The core part includes a part of the phase of the monoclinic titanium dioxide.

12 Claims, 8 Drawing Sheets

(51) Int. Cl.
*H01M 4/48* (2010.01)
*H01M 10/42* (2006.01)
*H01M 10/0525* (2010.01)
*C01G 23/00* (2006.01)
*C01G 23/047* (2006.01)
*H01M 4/02* (2006.01)

(52) U.S. Cl.
CPC .......... *C01G 23/047* (2013.01); *H01M 4/483* (2013.01); *H01M 4/485* (2013.01); *H01M 10/0525* (2013.01); *C01P 2002/32* (2013.01); *C01P 2002/76* (2013.01); *C01P 2004/54* (2013.01); *C01P 2004/61* (2013.01); *C01P 2004/62* (2013.01); *C01P 2004/64* (2013.01); *C01P 2004/84* (2013.01); *C01P 2006/12* (2013.01); *C01P 2006/40* (2013.01); *H01M 10/425* (2013.01); *H01M 2004/027* (2013.01); *H01M 2220/20* (2013.01); *Y02E 60/122* (2013.01); *Y02T 10/7011* (2013.01)

(58) Field of Classification Search
CPC .... H01M 4/483; H01M 4/485; C01G 23/003; C01G 23/005; C01G 23/047; C01P 2002/32; C01P 2002/76; C01P 2004/54; C01P 2004/61; C01P 2004/62; C01P 2004/64; C01P 2004/84; C01P 2006/12; C01P 2006/40
See application file for complete search history.

(56) References Cited

U.S. PATENT DOCUMENTS

| | | |
|---|---|---|
| 2009/0053605 A1 | 2/2009 | Harada et al. |
| 2011/0003788 A1 | 1/2011 | Fujii et al. |
| 2011/0073804 A1 | 3/2011 | Sotokawa et al. |
| 2011/0274962 A1 | 11/2011 | Inagaki et al. |
| 2012/0244414 A1* | 9/2012 | Inagaki ................. H01M 4/485 429/149 |
| 2013/0119306 A1 | 5/2013 | Song et al. |
| 2013/0244114 A1 | 9/2013 | Yamamoto et al. |

FOREIGN PATENT DOCUMENTS

| | | |
|---|---|---|
| JP | 2009-43679 | 2/2009 |
| JP | 2009-043679 A | 2/2009 |
| JP | 2009-54298 | 3/2009 |
| JP | 2010-170799 | 8/2010 |
| JP | 2011-513199 A | 4/2011 |
| JP | 2012-214362 | 11/2012 |
| JP | 2012-248333 | 12/2012 |
| JP | 2013-105744 | 5/2013 |
| WO | WO 2009/028530 A1 | 3/2009 |

OTHER PUBLICATIONS

Written Opinion dated Jun. 24, 2014 in PCT/JP2014/057566 filed Mar. 19, 2014.

René Marchand et al., "TiO$_2$(B) A New Form of Titanium Dioxide and the Potassium Octatitanate K$_2$Ti$_8$O$_{17}$" Material Research Bulletin, vol. 15, 1980, pp. 1129-1133.

* cited by examiner

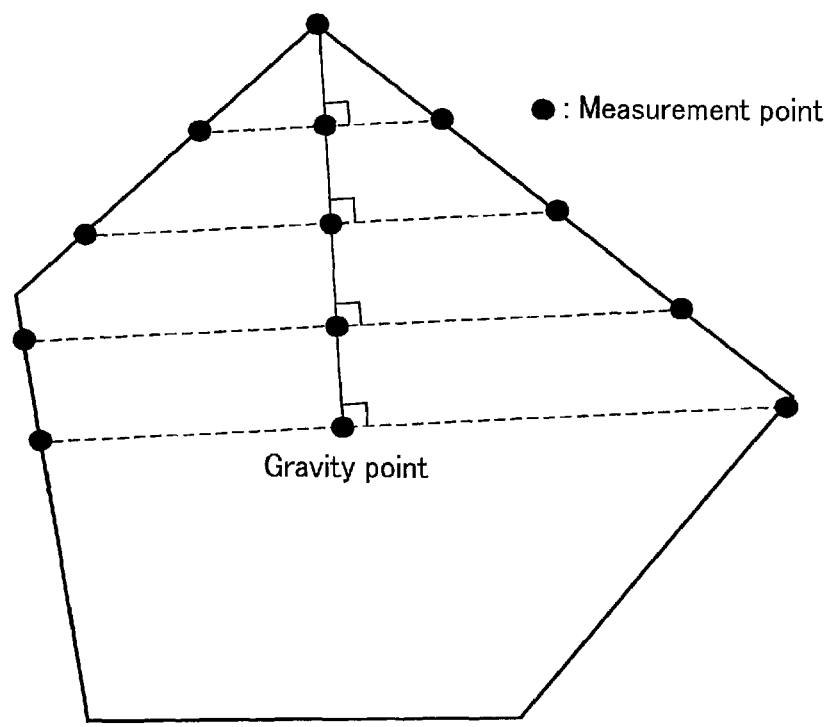
F I G. 3
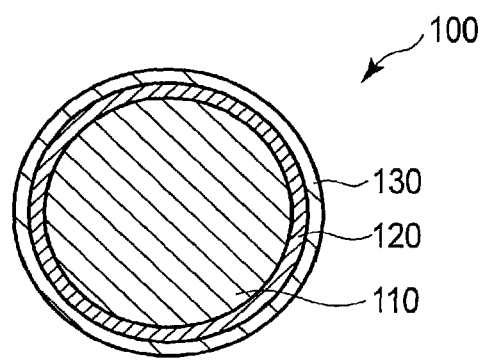
F I G. 4

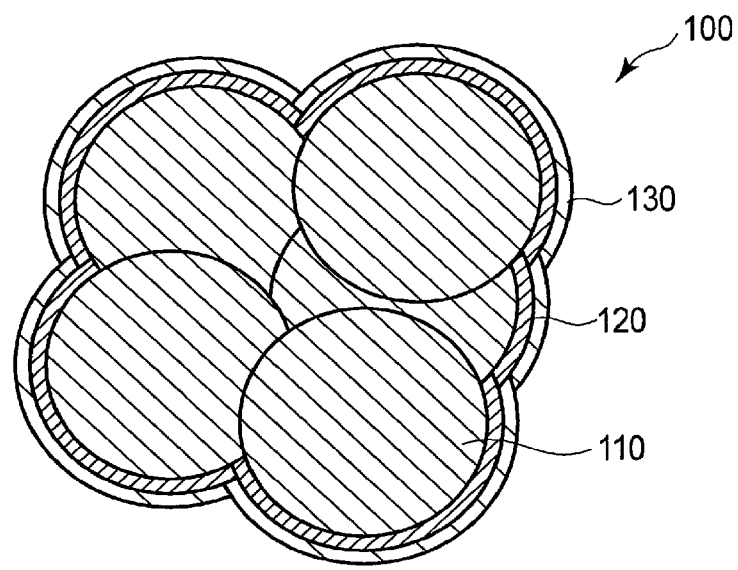
F I G. 5
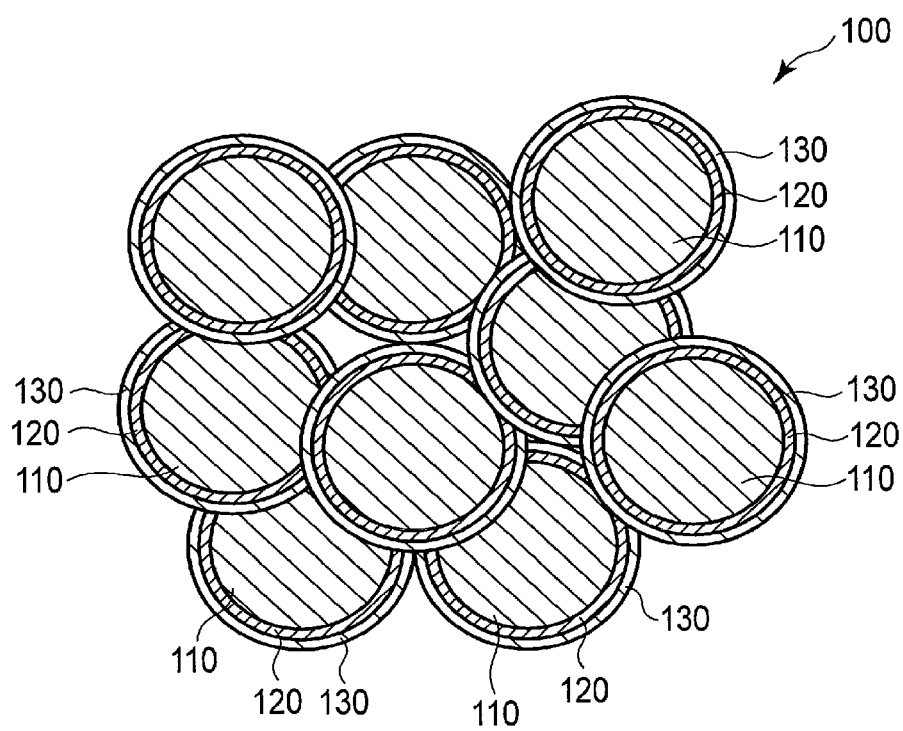
F I G. 6

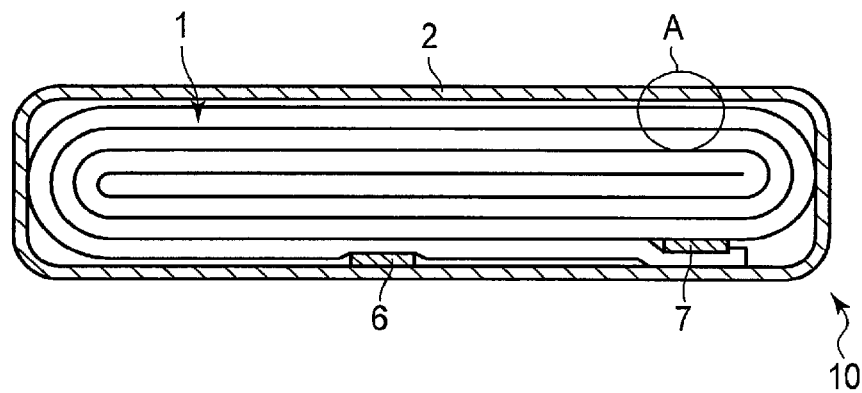
F I G. 7
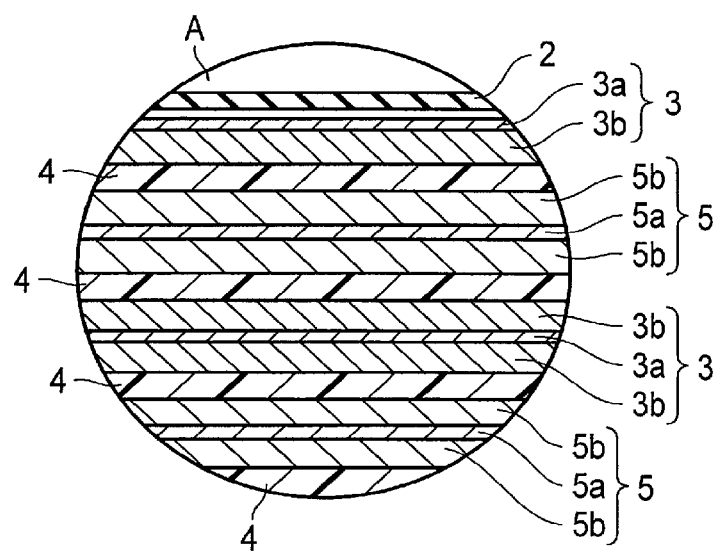
F I G. 8

ELECTRODE MATERIAL, NONAQUEOUS ELECTROLYTE BATTERY, BATTERY PACK, AND VEHICLE

CROSS-REFERENCE TO RELATED APPLICATIONS

This application is a Continuation application of PCT Application No. PCT/JP2014/057566, filed Mar. 19, 2014, the entire contents of which are incorporated herein by reference.

FIELD

Embodiments of described herein relate generally to an electrode material for a battery, a nonaqueous electrolyte battery, a battery pack, and vehicle.

BACKGROUND

Recently, research and development of a lithium ion secondary battery has been progressing in which lithium ions transfer between a negative electrode and a positive electrode to perform charge and discharge as a battery having a high energy density. In particular, the nonaqueous electrolyte battery is expected to be a power source for hybrid automobiles or electric automobiles, or an uninterruptible power supply in a cellular phone base station, and it is required to have many properties in addition to increased energy density, which has hitherto been required, such as rapid charge and discharge property, long-term reliability, and safety.

Recently, a metal composite oxide has started to receive attention as a lithium host of an electrode. In particular, in an electrode material using a titanium oxide as a metal oxide, it is possible to stably perform rapid charge and discharge in terms of the potential properties thereof, and the electrode material has a property capable of giving a longer lifetime to the electrode compared to a carbon material conventionally used. Some electrode materials described above, however, have a defect of a low energy density, because titanium oxide has a higher potential to metal lithium than that of a generally used carbon electrode, and has a low capacity density per weight. For example, it is known that a lithium-titanium composite oxide such as $Li_4Ti_5O_{12}$ has a theoretical capacity of about 175 mAh/g, which is lower than an electrode capacity of a generally used graphite electrode material of about 385 mAh/g. In many of these compounds, the number of equivalent sites in which lithium ions can be inserted is small due to the crystal structure thereof and the lithium is easily stabilized in the structure, and thus they have a defect in which a substantial capacity is decreased.

On the other hand, the electrode potential of titanium oxide is caused by an oxidation-reduction reaction between $Ti^{3+}$ and $Ti^{4+}$ when lithium is electrically inserted and extracted. The electrode potential of titanium oxide, thus, is electrochemically limited to a potential of about 1.5 V on the basis of the metal lithium. In order to further improve the energy density, accordingly, it is necessary to improve the electrode capacity of the material.

In view of the circumstances described above, a monoclinic titanium dioxide, $TiO_2$ (B), has recently received attention. In a spinel type lithium titanate $Li_4Ti_5O_{12}$, which has been practically used, the number of lithium ions capable of deinsertion is 3 per unit chemical formula, and thus the number of lithium ions capable of deinsertion is 3/5 per titanium ion, i.e., theoretically at most 0.6. On the other hand, in $TiO_2$ (B), the number of lithium ions capable of deinsertion is at most 1.0 per titanium ion, and thus the theoretical capacity is high, i.e., about 330 mAh/g. $TiO_2$ (B), accordingly, can be expected to be an electrode material having a high capacity.

On the other hand, many of the monoclinic titanium dioxide compounds have a property as a solid catalyst, and thus it is known that the compounds have a high reactivity with an organic electrolytic solution when they are used as a battery electrode material. When titanium oxide is reacted with the electrolytic solution, many problems such as decreased properties of the electrode caused by a reaction by-product, an increased internal resistance of the battery, and a decreased life performance caused by a deteriorated electrolytic solution occur. In particular, if there is a slight amount of water contained in production steps of starting materials and an assembly step of a battery, the titanium oxide has solid acid points having a high reactivity on the surface thereof. A monoclinic titanium dioxide compound, $TiO_2$ (B), expresses especially a high solid acidity in water. It is difficult to chemically complete remove water from the electrode material for a battery in terms of the properties of the starting materials and the cost.

In view of these problems, measures in which the surface on which the solid acid points (active points) such as hydroxyl groups ($OH^-$) and hydroxyl radicals (OH.) exist of $TiO_2$ (B) is modified are adopted. As such measurements, for example, methods of modifying an alkali metal cation ($Li^+$, $Na^+$ or $K^+$), an alkaline earth metal cation ($Mg^+$ or $Ca^+$), a transition metal ($Mn^{3+}$, $Co^{2+}$ or $Cu^+$) and a sulfide ion ($S^{2-}$), or a sulfate ion ($SO^{4-}$) are disclosed. The methods, however, have a problem in which the modified cation can be eluted into the electrolytic solution during long time use.

BRIEF DESCRIPTION OF THE DRAWINGS

FIG. 3 is a view explaining a specific example for examining a tilting of a composition in a particle.

FIG. 4 is a cross-sectional schematic view showing a first example of an electrode material for a battery according to a first embodiment.

FIG. 5 is a cross-sectional schematic view showing a second example of the electrode material for a battery according to the first embodiment.

FIG. 6 is a cross-sectional schematic view showing a third example of the electrode material for a battery according to the first embodiment.

FIG. 7 is a cross-sectional schematic view showing one example of nonaqueous electrolyte batteries according to a second embodiment.

FIG. 8 is an enlarged view of a part A in FIG. 7.

DETAILED DESCRIPTION

Figure 1:
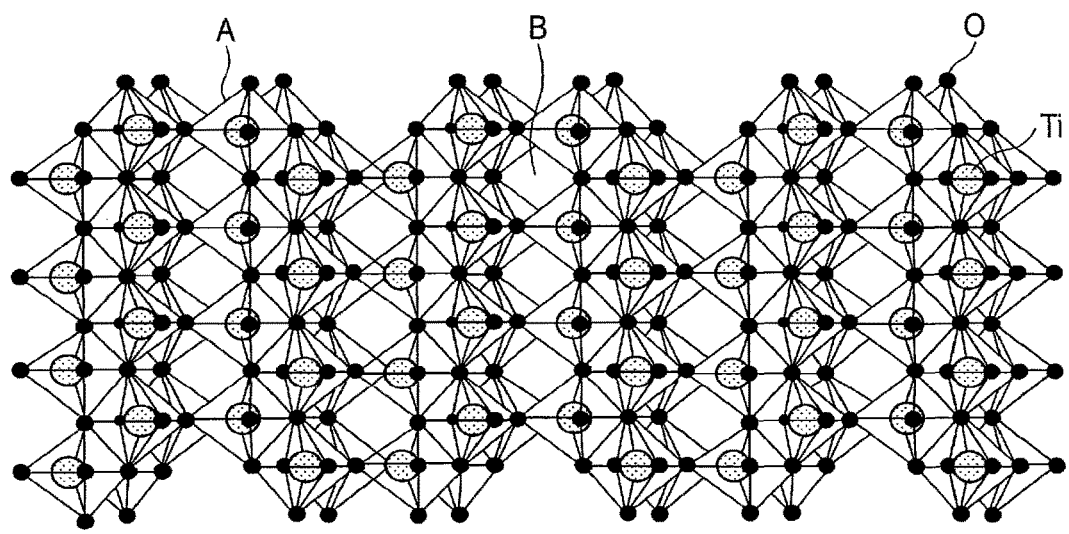
FIG. 1 is a schematic view showing a crystal structure of a monoclinic titanium dioxide.

According to a first embodiment, an electrode material is provided. The electrode material includes active material particles. The active material particle includes a phase of a monoclinic titanium dioxide and a phase of a spinel type lithium titanate. The active material particle includes a shell part and a core part surrounded by the shell part. The shell part is formed by dispersing at least a part of the phase of the spinel type lithium titanate on the active material particle. The core part includes a part of the phase of the monoclinic titanium dioxide.

According to a second embodiment, a nonaqueous electrolyte battery including the electrode material according to the first embodiment is provided. The nonaqueous electrolyte battery includes a negative electrode, a positive electrode, and nonaqueous electrolyte. The electrode material according to the first embodiment can be used in the negative electrode or the positive electrode, or in both of the negative electrode and the positive electrode.

According to a third embodiment, a battery pack is provided. The battery pack includes the nonaqueous electrolyte battery according to the second embodiment.

According to a fourth embodiment, a vehicle is provided. The vehicle includes the battery pack according to the third embodiment.

Embodiments are explained below referring to drawings. In the following descriptions, the same reference number is applied to structural features having the same or similar function throughout all drawings, and overlapped explanations are omitted. Each drawing is a schematic view for explaining the embodiment and promoting the understanding thereof. Shapes, sizes and ratios in the drawing, accordingly, may be different from those in a practical apparatus, but they may be appropriately designed and changed considering the following descriptions and known technology.

First Embodiment

According to a first embodiment, an electrode material for a battery is provided. The electrode material for a battery includes active material particles. The active material particle includes a phase of a monoclinic titanium dioxide and a phase of the spinel type lithium titanate. The active material particle includes a shell part and core part surrounded by the shell part. The shell part is formed by dispersing at least a part of the phase of the spinel type lithium titanate on the active material particle. The core part includes a part of the phase of the monoclinic titanium dioxide.

First, the monoclinic titanium dioxide and the spinel type lithium titanate are explained.

First, monoclinic titanium dioxide is explained referring to FIG. 1.

FIG. 1 is a schematic view showing a crystal structure of a monoclinic titanium dioxide. In FIG. 1, spheres forming octahedron crystal lattices are oxygen atoms and a sphere around the center of the octahedron is a titanium element.

The monoclinic titanium dioxide, mainly represented by a space group C2/m, has, as shown in FIG. 1, a crystal structure with a tunnel structure. The monoclinic titanium dioxide can be represented by the general formula: $Li_xTiO_2$ wherein x can vary within a range of $0 \leq x \leq 1$ depending on the state-of-charge. In the instant specification, the description of the monoclinic titanium dioxide includes a case in which the lithium ion is contained in the structure. In the symmetry in the monoclinic titanium dioxide of the space group, or the like, there may be differences because of the occurrence of a deformation due to the intercalate amount or the kind thereof. The monoclinic titanium dioxide contained in the electrode material for a battery according to the first embodiment, however, is the monocline represented by the space group C2/m, schematically shown, mainly, in FIG. 1. With respect to the detailed crystal structure of the monoclinic titanium dioxide, please see, for example, R. Marchand, L. Brohan, M. Tournoux, Material Research Bulletin 15, 1129 (1980).

As shown in FIG. 1, in the crystal structure of the monoclinic titanium dioxide, structural frameworks A, formed of the titanium ions and the oxide ions, are alternatively arranged, and cavities B, located between them, are spaces which are hosts of the lithium ion. It is said that there are sites where lithium ions can be inserted and extract also on the crystal surface in the monoclinic titanium dioxide. The monoclinic titanium dioxide has a nature capable of intercalating (inserting) different atomic species into the cavity B or adsorbing and releasing them on the crystal surface. Therefore, the monoclinic titanium dioxide can adsorb many elements and organic compounds other than the lithium ion, or the many elements and the organic compounds can be inserted in it.

When $Li^+$ is intercalated into the tunnel-shaped cavity B in the crystal structure of the monoclinic titanium dioxide, $Ti^{4+}$, forming the framework, is reduced to $Ti^{3+}$, and consequently the crystals of the monoclinic titanium dioxide can be maintained electrically neutral. The monoclinic titanium dioxide has one $Ti^{4+}$ ion per unit lattice, and thus it is theoretically possible to newly insert at most one $Li^+$ ion between the layers. This is a reason why the x value in the general formula: $Li_xTiO_2$ can take a range of $0 \leq x \leq 1$, and a reason why the theoretical capacity is 335 mAh/g. This value is a theoretical capacity approximately twice of the value obtained, for example, compared to the spinel type lithium titanate. The electrode material for a battery according to the first embodiment, containing the active material particles, which are primary particles or secondary particles of the monoclinic titanium dioxide, accordingly, can realize a nonaqueous electrolyte battery capable of showing the excellent battery capacity.

On the other hand, many of the monoclinic titanium dioxide compounds have the property as the solid catalyst, and thus when the compound is used as the electrode material for a battery, the reactivity with an organic electrolytic solution is high, thus resulting in the decreased life span due to the deteriorated battery performance. For that reason, if the solid acidity in the monoclinic titanium dioxide compound is not inhibited, there is the problem in which the performances are remarkably decreased, as described above. In addition, if the surface of the monoclinic titanium dioxide is modified or coated, the modifying ions or the coating material may possibly elute into the electrolytic solution during the use of the nonaqueous electrolyte battery containing such a monoclinic titanium dioxide.

Figure 2:
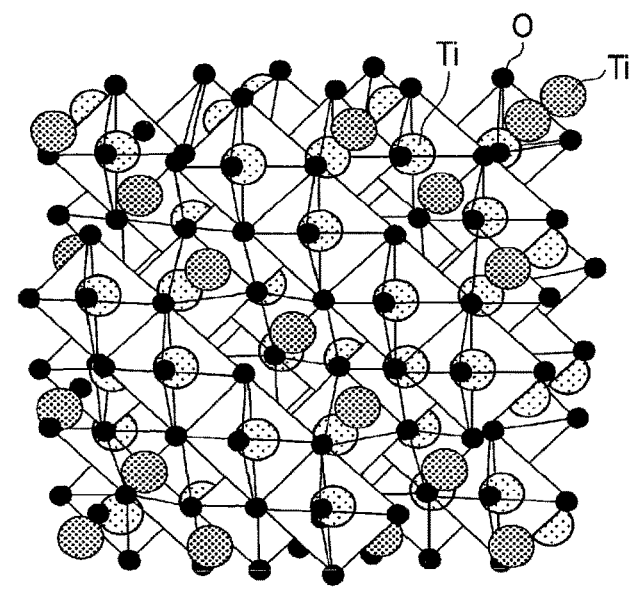
FIG. 2 is a schematic view showing one example of a crystal structure of a spinel type lithium titanate.
Figure 2:
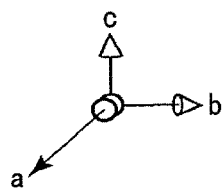

Next, the spinel type lithium titanate is explained referring to FIG. 2.

FIG. 2 is a schematic view showing one example of the crystal structure of the spinel type lithium titanate. In FIG. 2, spheres forming octahedron lattices are oxygen atoms, a sphere inserted to the center of the octahedron lattice is a titanium element, and spheres clamping one surface of the crystal lattice in an a axis direction is a lithium element.

The spinel type lithium titanate can be represented, for example, by the general formula: $Li_{4+x}Ti_5O_{12}$. The value of x in the general formula above can vary within the range of $0 \leq x \leq 3$ depending on the state-of-charge. The spinel type lithium titanate has generally the crystal structure as shown in FIG. 2, but the structure is not limited to that crystal structure.

Such a spinel type lithium titanate does not solid acid points on the surface, unlike the monoclinic titanium dioxide. When such a spinel type lithium titanate is conjugated with the monoclinic titanium dioxide, the solid acid points on the monoclinic titanium dioxide can be neutralized.

The active material particles contained in the electrode material for a battery according to the first embodiment contains a shell part formed by dispersing at least a part of the phase of the spinel type lithium titanate in the surface of the active material particles. The thus formed shell part is located on the surface of the active material particles and surrounds the core part, and thus the contact of the solid acid points on the monoclinic titanium dioxide contained in the active material particle with the nonaqueous electrolyte can be prevented.

Also, because at least a part of the phase of the spinel type lithium titanate is dispersed on the surface of the active material particles, the phase of the spinel type lithium titanate phase does not modify the surface of the active material particles or does not coat the surface of the active material particles. During the use of the electrode material for a battery according to the first embodiment, accordingly, the elution of the spinel type lithium titanate into the electrolytic solution can be prevented.

In addition, the lithium ions can be inserted in and extracted from the spinel type lithium titanate, and thus it can participate with the charge and discharge reaction of the electrode material for a battery according to the first embodiment.

As described above, in the electrode material for a battery according to the first embodiment, the contact of the solid acid points on the monoclinic titanium dioxide with nonaqueous electrolyte can be prevented, and thus the reaction of the solid acid points on the monoclinic titanium dioxide with the nonaqueous electrolyte can be prevented during the use in the nonaqueous electrolyte battery. In the electrode material for a battery according to the first embodiment, the elution of the modified ions and the coating material into the electrolytic solution can also be prevented during the use in the nonaqueous electrolyte battery. Owing to this, the electrode material for a battery according to the first embodiment can advantageously utilize the excellent battery capacity, which can be realized by the monoclinic titanium dioxide, while the deterioration of the battery performance due to the change with time is prevented. The electrode material for a battery according to the first embodiment, accordingly, can realize the nonaqueous electrolyte battery capable of showing the excellent battery capacity and the good cycle life.

The electrode material for a battery according to the first embodiment is explained in more detailed below.

The shell part on the active material particle is formed by dispersing at least a part of the phase of the spinel type lithium titanate on the surface of the active material particle, and thus there is no clear boundary between the shell part and the other part of the active material particle.

In the instant specification, the shell part is assumed to be a part in which the monoclinic titanium dioxide exists in an abundance ratio of less than 100% by mole. The shell part whose abundance ratio of the monoclinic titanium dioxide is within the range described above contains the monoclinic titanium dioxide in which the solid acid points are sufficiently neutralized by the spinel type lithium titanate, or does not contain the monoclinic titanium dioxide, and thus the reaction of the solid acid points on the monoclinic titanium dioxide with the nonaqueous electrolyte can be sufficiently prevented. For example, when the shell part contains another part of the phase of the monoclinic titanium dioxide, solid acid points of the another part of the phase of the monoclinic titanium dioxide are sufficiently neutralized by the phase of the spinel type lithium titanate. Therefore, the reaction of the solid acid points on the monoclinic titanium dioxide with the nonaqueous electrolyte can be sufficiently prevented. It is preferable that such a shell part is contained in a ratio of 1% by mass to 50% by mass relative to the mass of the electrode material for a battery. The electrode material for a battery according to the first embodiment containing the shell part in the ratio described above can realize the nonaqueous electrolyte battery capable of showing the more excellent cycle life.

For the same reason as in the shell part, there is no clear boundary between the core part and the other part of the active material particle.

In the instant specification, it is preferable that the core part is contained in a ratio of 99% by mass to 50% by mass relative to the mass of the electrode material for a battery. The electrode material for a battery according to the first embodiment containing the core part in the ratio described above can realize the nonaqueous electrolyte battery capable of showing the more excellent battery capacity.

The active material particles may further contain an intermediate part between the core part and the shell part. The intermediate part of the active material particle can be formed by dispersing at least a part of the phase of the spinel type lithium titanate on the surface and in the inside of the active material particle. The intermediate part, accordingly, can contain a part of the phase of the monoclinic titanium dioxide and a part of the phase of the spinel type lithium titanate.

Here, the intermediate part is formed by dispersing at least a part of the phase of the spinel type lithium titanate on the surface and in the inside of the active material particle, and thus there is no clear boundary between the core part and the intermediate part and between the intermediate part and the shell part.

In the electrode material for a battery according to the first embodiment, it is preferable that, in the intermediate part, a concentration of the spinel type lithium titanate of an area adjacent to the shell part is higher than the concentration of an area adjacent to the core part. The intermediate part more preferably has a concentration gradient of the spinel type lithium titanate which increases in a direction away from the core part. In the intermediate part having such a concentration gradient, the reaction of the solid acid points on the monoclinic titanium dioxide with the nonaqueous electrolyte can be further prevented.

In the intermediate part, the crystal lattice of the monoclinic titanium dioxide and the crystal lattice of the spinel type lithium titanate may interpenetrate.

In the interface between the core part and the shell part, or the interface between the core part and the intermediate part, the crystal lattice of the monoclinic titanium dioxide is brought into contact with the crystal lattice of the spinel type lithium titanate.

The active material particles may be primary particles or secondary particles, formed by aggregation of the primary particles. In the active material particles, which are the secondary particles, at least a part of the phase of the spinel type lithium titanate may be dispersed on the surface of the secondary particles. Alternatively, at least a part of the phase of the spinel type lithium titanate may be dispersed on the surface of each primary particle, forming the secondary particle.

A crystal structure of each part contained in the electrode material for a battery can be observed, for example, by a powder X-ray diffraction measurement, a transmission electron microscope (TEM) observation, or the like. These measurement methods are explained in detailed below.

A composition of elements contained in the electrode material for a battery can be measured, for example, by an energy dispersive X-ray spectrometry (EDX) analysis.

<Particle Size, Aspect Ratio, and BET Specific Surface Area>

An average particle size of the active material particles, which are primary particles or secondary particles of the monoclinic titanium dioxide, is not particularly limited. For example, the active material particles can contain crystals of the monoclinic titanium dioxide having an aspect ratio within a range of 1 to 50, a minor axis within a range of 0.1 μm to 50 μm, and a major axis of 0.1 μm to 200 μm. These parameters can be varied depending on the battery characteristic required. For example, when a rapid charge and discharge is necessary, it is preferable that the aspect ratio is adjusted to 1, and the major axis and the minor axis are adjusted to 0.1 μm. When the parameters are adjusted as described above, a diffusion length of the lithium ions in the crystals can be shortened, thus resulting in the realization of the rapid charge and discharge. On the other hand, when a high capacity is necessary, it is preferable for example that the aspect ratio is adjusted to 10 or more, the minor axis is adjusted to 5 μm, and the major axis is adjusted to 50 to 200 μm. When the parameters are adjusted as described above, the number of side surfaces in the longitudinal direction of the crystals, i.e., (001) surfaces, which are oriented surfaces, can be intentionally increased in a pressed electrode, and an electrode having many crystal surfaces advantageous to lithium insertion and extraction can be formed. Crystals having a major axis and minor axis of 0.1 μm or more can realize good valance between the contact area of the electrode to the electrolytic solution and the crystallinity. Crystals having a major axis of less than 200 μm have the good dispersibility in the solvent when the electrode is made, and can easily stabilize slurry.

A BET specific surface area of the active material particles is not particularly limited, and it is preferably within a range of 5 m$^2$/g to 100 m$^2$/g. The BET specific surface area of the active material particles within the range described above can provide a contact area preferable for both of the battery characteristics and the lifetime property, and in the production steps, it is possible to easily perform the electrode coating.

For the specific surface area analysis, a method in which a molecule whose adsorption occupation area is known is adsorbed on the surface of the powder particles at a liquid nitrogen temperature, and a specific surface area of the sample is obtained from the adsorption amount is used. A BET method according to a physical adsorption of an inert gas at a low temperature and a low humidity is most often utilized. This method is based on the most famous theory as a calculation method of the specific surface area, in which a Langmuir theory, which is a monomolecular layer adsorption theory, is expanded to a multi-molecular layer adsorption theory. In the instant specification, the specific surface area obtained by the BET method is called a "BET specific surface area."

<Production Method>

The electrode material for a battery according to the first embodiment can be produced, for example, by some production methods shown below.

First Example

First, as a starting material, an alkali titanate compound such as $Na_2Ti_3O_7$, $K_2Ti_4O_9$, or $Cs_2Ti_5O_{12}$ is prepared.

The alkali titanate compound, which is the starting material, is obtained, for example, by a general solid phase reaction in which starting oxides and carbonates are mixed in a stoichiometric ratio, and the mixture is heated. Alternatively, a commercially available alkali titanate compound may be used. The crystal shape is not particularly limited. In order to remove impurities from the starting alkali titanate compound powder, the product thoroughly washed with distilled water is used.

Using the thus prepared alkali titanate compound, a proton titanate compound is synthesized by an ion-exchange method. Specifically, the alkali titanate compound, prepared as above, is subjected to an acid treatment to exchange alkali cations into protons. Potassium ions, sodium ions, and cesium ions, contained in potassium titanate, sodium titanate and cesium titanate respectively, can be exchanged to protons without collapse of the crystal structures. The proton exchange according to the acid treatment is performed by adding hydrochloric acid, nitric acid, or sulfuric acid with a concentration of 0.5 to 2 M to an alkali titanate compound powder and stirring them. At that time, it is desirable that the treatment is performed until the proton exchange is sufficiently completed. In particular, this treatment needs care, because when potassium or sodium, contained in the starting material, remains, the charge and discharge capacity is decreased. The acid treatment time in the present invention is not particularly limited, and when the treatment is performed at room temperature of about 25° C. using hydrochloric acid with a concentration of about 1 M, the treatment is desirably performed for 24 hours or more, more preferably for one to two weeks. In order to securely perform the proton exchange, it is desirable to change the acid solution to a fresh acid solution every 24 hours. After that, washing with distilled water is thoroughly performed until the pH of the washing water is within a range of 6 to 8.

The produce after the proton exchange is washed with water and dried, whereby a proton titanate compound, which is an intermediate product (precursor), can be obtained.

Next, a lithium substitution treatment, which is a treatment to substitute at least a part of the protons of the proton titanate compound, which is the intermediate product (precursor), with lithium ions. A lithium source used in this treatment is not particularly limited, and it is preferable to use lithium hydroxide which does not contain impurities other than the proton and the lithium. The precursor is stirred in an aqueous lithium hydroxide solution, whereby at least a part of the protons can be substituted by Li. The substitution method is not particularly limited, and it is desirable to perform stirring in an aqueous lithium hydroxide solution, heated to lower than 100° C. The concentration is not particularly limited, and a concentration is preferably from 1 M to 5 M. The treatment time varies depending on the size of the primary particle, and if the particle size is from about 1 to 5 μm, the time is preferably from about 24 to 72 hours. The abundance ratio of the monoclinic titanium dioxide $TiO_2$ (B) and the spinel type lithium titanate $Li_4Ti_5O_{12}$, which are the final desired product, can be appropriately adjusted by changing the treatment time depending on the particle size.

Next, the precursor, in which at least a part of the protons are substituted by lithium, is subjected to a heat-treatment, whereby the final desired product, a mixed crystals of the monoclinic titanium dioxide $TiO_2$ (B) and the spinel type lithium titanate $Li_4Ti_5O_{12}$ can be obtained. An appropriate heat-treatment temperature of the precursor varies depending on the starting material composition of the proton-exchanged product, the particle size, the crystal shape, and the like. Even if any starting material is used, the electrode material for a battery in which the monoclinic titanium dioxide $TiO_2$ (B) and the spinel type lithium titanate $Li_4Ti_5O_{12}$ are conjugated, and which can realize the non-aqueous electrolyte battery having the excellent charge and discharge cycle characteristics and capable of showing the high battery capacity can be synthesized by controlling the heating temperature and time. The heating temperature is within a range of 300° C. to 800° C., in particular, preferably 550° C. to 750° C. because a high capacity is shown. When the heating temperature is lower than 300° C., the spinel titanate compound is not produced, and the crystallinity of $TiO_2$ (B) is remarkably poor, and thus undesirably the electrode capacity, the charge and discharge efficiency, and the repeating property are decreased. On the other hand, when the heating temperature is higher than 800° C., the spinel type lithium titanate $Li_4Ti_5O_{12}$ and an anatase phase are dominantly produced, and thus undesirably merit due to the high capacity of the monoclinic titanium dioxide cannot be obtained. The heat-treatment conditions have first found by experimental results by the present inventors.

Second Example

Another preferable embodiment is exemplified by a method of obtaining a precursor in which a part of protons are substituted by lithium using titanium dioxide and an aqueous lithium hydroxide solution according to a hydrothermal synthesis method. According to this method, finely particulate titanium dioxide is previously dispersed in an aqueous lithium hydroxide solution with a concentration of about 3 M, and it is heated and pressurized at 180° C. for 24 hours in an autoclave, whereby a precursor in which a part of a proton titanate compound is substituted by lithium can be obtained in one-step. The obtained product is subjected to a heat-treatment, as in the first example, whereby mixed crystals of the monoclinic titanium dioxide $TiO_2$ (B) and the spinel type lithium titanate $Li_4Ti_5O_{12}$ can be obtained.

Third Example

A further other preferable embodiment is a method in which the spinel type lithium titanate $Li_4Ti_5O_{12}$ is conjugated on the surface of particles of the monoclinic titanium dioxide $TiO_2$ (B), previously synthesized, by a post-treatment.

In this case, the proton exchange of the alkali titanate compound powder, which is one of the starting materials recited in the first example, is performed, and a heat-treatment is performed at 300° C. to 550° C. to obtain a monoclinic titanium dioxide $TiO_2$ (B) phase.

A method of conjugating the spinel type lithium titanate $Li_4Ti_5O_{12}$ on the surface of the particles is exemplified by a synthesis by a solution method (a sol-gel method, or a precipitation method). For example, a titanium alkoxide is used as the titanium starting material, and a water-soluble salt or alkoxide is used as the lithium starting material. Specifically, titanium isopropoxide is dissolved in ethanol, and then a nitrate or an alkoxide of lithium is dissolved so as to have a desired composition. The products are thoroughly stirred with the monoclinic titanium dioxide $TiO_2$ (B) particles, and the resulting mixture is subjected to a hydrolysis treatment to obtain a gel mixture. At this time, when the monoclinic titanium dioxide $TiO_2$ (B) particles are mixed with the solution, and the mixture is put in a vacuum reduced pressure, whereby pores and voids can be impregnated with the gel solution. The obtained gel mixture is heated at about 90° C. to about 120° C. to dry it, and then is heated at 450° C. to 800° C., whereby the spinel type lithium titanate $Li_4Ti_5O_{12}$ can be conjugated on the surface of the monoclinic titanium dioxide $TiO_2$ (B) particles. According to the method, the spinel type lithium titanate $Li_4Ti_5O_{12}$ can be conjugated on the surface of secondary particles of the monoclinic titanium dioxide $TiO_2$ (B).

<Powder X-Ray Diffraction Measurement of Electrode Material>

The powder X-ray diffraction measurement of the electrode material can be performed, for example, as follows:

First, a target sample is pulverized until the average particle size is about 5 μm. The pulverized sample is put in a holder having a depth of 0.2 mm formed on a glass sample plate. At that time, care should be taken so that a sufficient amount of the sample is put in the holder. Care should also be taken so that a proper amount of the sample is put in not to generate cracks or cavities.

Subsequently, the sample is pressed with another glass plate from the outside, to make the surface of the sample filled in the holder smooth. Care should be taken so that unevenness is not generated from a reference surface of the holder due to the too much or too small an amount of the sample put in.

Next, the glass plate in which the sample is put a powder X-ray diffraction apparatus, and a diffraction pattern is obtained using Cu-Kα rays.

The orientation of the particles may become high depending on the particle shape of the sample. When the orientation of the sample is high, the position of the peak may sometimes be shifted or the intensity ratio may sometimes be changed depending on the way to put in the sample. A sample having a remarkably high orientation, as described above, is measured using a glass capillary. Specifically, the sample is inserted to a capillary, the capillary is put on a rotary sample stand, and the measurement is performed. The orientation can be lessened by the measurement method described above. As the glass capillary, it is preferable to use a capillary made of Lindemann glass, having a diameter of 1 mm to 6 mm φ.

The powder X-ray diffraction measurement of the active material contained in the electrode can be performed, for example, as follows:

First, in order to know a crystal state of an electrode material, lithium ions are completely removed from a monoclinic titanium dioxide. For example, when the electrode material is used for a negative electrode, a battery is made completely in a state-of-discharge. However, even if the battery is in the state-of-discharge, the lithium ions may sometimes remain.

Next, the battery is disassembled in a glove box in which argon is filled, the electrode is taken out therefrom, and it is washed with an appropriate solvent. As the appropriate solvent, it is possible to use, for example, ethylmethyl carbonate, or the like. If the electrode is insufficiently washed, impurity phases such as lithium carbonate or lithium fluoride may be contained by the influence of the lithium ions remaining in the electrode. In such a case, it is enough that an air-tight container is used in which the measurement can be performed in an inert gas atmosphere. The washed electrode is cut into a size which is almost the same area of the holder in the powder X-ray diffraction apparatus, which is used as a sample for measurement. The measurement is performed directly sticking the sample to the glass holder. At that time, a peak corresponding to a metal of a metal foil contained in an electrode substrate is previously measured using XRD, and a peak position resulting from the electrode substrate is known. In addition, peaks of other components such as a conductive assistant and a binder are previously measured and known in the same manner as above. When the peak of the substrate material is overlapped with the peak of the active material, it is desirable to perform the measurement after the active material is peeled off from the substrate, in order to separate the overlapped peaks when the peak intensity is quantitatively measured. The operation can be of course omitted if this is known in advance. The electrode may be physically peeled off, but it is easy peeled off by application of ultrasonic wave in a solvent. When the active material is peeled off from the substrate by the ultrasonic wave treatment, the solvent is evaporated, whereby the electrode powder (including the active material, the conductive assistant, and the binder) can be recovered. The recovered electrode powder is filled, for example, in a Lindemann glass capillary, and the measurement is performed, whereby the powder X-ray diffraction measurement of the active material can be performed. The electrode powder, recovered using the ultrasonic wave treatment, can be subjected to various analyses other than the powder X-ray diffraction measurement.

<TEM Observation of Electrode Material>

According to a transmission electron microscope (TEM) observation, distribution of each crystal in a material having a mixed phase can be confirmed.

Upon the transmission electron microscope observation, it is desirable that a sample powder, which is a target, is embedded in a resin, and an inside of the sample is cut by mechanical sanding or ion milling. Even if the target sample is an electrode, the same treatment can be performed. For example, the electrode is embedded in the resin as it is and a desired part can be observed, or a current collector (a metal foil) is peeled off from the electrode and an electrode powder containing the conductive material and the binder can be observed. In this way, how the two crystal phases are distributed in the primary particle can be known, and the tilting of the composition in the particle can also be known.

A specific example is explained below referring to FIG. 3. First, a gravity point of a particle, which is a sample to be measured, is assumed as a center of the particle. Next, 5 measurement points are set on a straight line from the center of the particle to an arbitrary point on the surface of the particle at even intervals. On three points in an area perpendicular to each measurement point, many-beam interference images in the particle part are examined, and an electron beam diffraction pattern is observed. From this observation, a crystal structure contained in the measurement point can be known. For example, when an electron beam diffraction pattern is previously simulated, the phase of the monoclinic titanium dioxide, the phase of the spinel type lithium titanate, and another phase can be easily distinguished.

Next, the specific example of the electrode material for a battery according to the first embodiment is explained referring to FIG. 4 to FIG. 6.

FIG. 4 is a cross-sectional schematic view showing a first example of the electrode material for a battery according to the first embodiment.

The electrode material for a battery 100 shown in FIG. 4 is an active material particle, which is an approximately spherical primary particle, containing a phase of monoclinic titanium dioxide and a phase of spinel type lithium titanate. The phase of the spinel type lithium titanate is dispersed on the surface and in the inside of the active material particle 100, whereby a shell part 130 containing a part of the phase of the spinel type lithium titanate, and an intermediate part 120 which is surrounded by the shell part and contains a part of the monoclinic titanium dioxide and a part of the spinel type lithium titanate are formed.

The active material particle 100 further contains core part 110, surrounded by the intermediate part 120. The core part 110 contains a part of the phase of the monoclinic titanium dioxide.

FIG. 5 is a cross-sectional schematic view showing a second example of the electrode material for a battery according to the first embodiment.

The electrode material for a battery 100 shown in FIG. 5 contains an active material particle 100 of a secondary particle, in which approximately spherical primary particles are aggregated. The active material particle 100 contains a phase of monoclinic titanium dioxide and a phase of spinel type lithium titanate. A part of the phase of the spinel type lithium titanate is dispersed on the surface and in the inside of the active material particle 100, which is the secondary particle. In this way, a shell part 130 containing a part of the phase of the spinel type lithium titanate, and an intermediate part 120 which is surrounded by the shell part and contains a part of the phase of the monoclinic titanium dioxide and a part of the phase of the spinel type lithium titanate are formed.

The active material particle 100 further contains a core part 110 surrounded by the intermediate part 120. The core part 110 contains a part of the phase of the monoclinic titanium dioxide.

In the electrode material for a battery 100 shown in FIG. 5, the spinel type lithium titanate is dispersed on the surface and in the inside of the active material particle, which is the secondary particle of the monoclinic titanium dioxide. Such an electrode material for a battery 100 can be produced, for example, by the production method in the third example described above.

FIG. 6 is a cross-sectional schematic view showing a third example of the electrode material for a battery according to the first embodiment.

The electrode material for a battery 100 shown in FIG. 6 is a secondary particle formed by aggregating the electrode material for a battery 100 of the first example, which is the primary particle shown in FIG. 4.

In FIG. 4 to FIG. 6, in order to clearly express a positional relation of each phase, a boundary is described between the core part 110 and the intermediate part 120, and between the intermediate part 120 and the shell part 130. However, in the electrode materials for a battery 100 shown in FIG. 4 to FIG. 6, the intermediate part 120 and the shell part 130 are formed by dispersing the phase of the spinel type lithium titanate on the surface and in the inside of the active material particle, which is the primary particle or the secondary particle, and thus it should be noted that there is not clear boundary between the core part 110 and the intermediate part 120, and between the intermediate part 120 and the shell part 130.

In the above embodiments, the lithium ion is disclosed as the charge carrier of the alkali cation, but the electrode material for a battery according to the first embodiment can be used in an electrode for a sodium ion battery, and the same effects can be obtained.

In the electrode material for a battery according to the first embodiment, the shell part formed by dispersing at least a part of the spinel type lithium titanate on the surface of the active material particle can prevent the contact of the solid acid points of the phase of the monoclinic titanium dioxide with the nonaqueous electrolyte. Owing to this, the electrode material for a battery according to the first embodiment can realize the nonaqueous electrolyte battery capable of showing the excellent battery capacity and cycle life.

Second Embodiment

According to the second embodiment, a nonaqueous electrolyte battery including the electrode material for a battery according to the first embodiment is provided. The nonaqueous electrolyte battery includes a negative electrode, a positive electrode, and nonaqueous electrolyte. The electrode material for a battery according to the first embodiment can be used in the negative electrode or the positive electrode, or in both of the negative electrode and the positive electrode.

The nonaqueous electrolyte battery according to the second embodiment may further contain a separator disposed between the positive electrode and the negative electrode. The positive electrode, the negative electrode, and the separator may be formed into an electrode group. The nonaqueous electrolyte can be held in the electrode group.

The nonaqueous electrolyte battery according to the second embodiment may further contain an exterior member housing the electrode group and the nonaqueous electrolyte.

In addition, the nonaqueous electrolyte battery according to the second embodiment may further contain a positive electrode terminal electrically connected to the positive electrode and a negative electrode terminal electrically connected to the negative electrode. At least a part of the positive electrode terminal and at least a part of the negative electrode terminal may extend from the outside of the exterior member.

The positive electrode, the negative electrode, the nonaqueous electrolyte, the separator, the exterior member, the positive electrode terminal, and the negative electrode terminal are explained in detailed.

(1) Positive Electrode

The positive electrode may have a current collector, and a positive electrode layer(s) (a positive electrode active material-containing layer) supported on one side or both sides of the current collector.

The positive electrode current collector is preferably an aluminum foil or aluminum alloy foil.

The aluminum foil or the aluminum alloy foil has a thickness of desirably 5 μm to 20 μm, more preferably 15 μm or less. The aluminum foil has preferably a purity of 99% by weight or more. As the aluminum alloy, alloy containing an element of magnesium, zinc, and/or silicon is preferable. It is preferable to adjust a content of a transition metal such as iron, copper, nickel and/or chromium contained in the aluminum foil or the aluminum alloy foil to 1% by weight or less.

The positive electrode layer may contain a positive electrode active material and a binder.

The positive electrode active material may include oxides, sulfides, and the like. It may include, for example, manganese dioxide ($MnO_2$), iron oxide, copper oxide and nickel oxide in which lithium can be inserted, lithium-manganese composite oxide (for example, $Li_xMn_2O_4$ or $Li_xMnO_2$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}Co_yO_2$), lithium-manganese-cobalt composite oxide (for example, $Li_xMn_yCo_{1-y}O_2$), spinel-type lithium-manganese-nickel composite oxide ($Li_xMn_{2-y}Ni_yO_4$), lithium-phosphorus oxide having an olivine structure ($Li_xFePO_4$, $Li_xFe_{1-y}Mn_yPO_4$, $Li_xCoPO_4$, and the like), iron sulfate ($Fe_2(SO_4)_3$), vanadium oxide (for example, $V_2O_5$), lithium-nickel-cobalt-manganese composite oxide, and the like. Here, $0<x<1$ and $0<y<1$. One sort of the positive electrode active material may be used alone or two sorts or more may be used in combination.

The positive electrode active material from which a high positive electrode voltage can be obtained may include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($LiNi_{1-y}Co_yO_2$), spinel-type lithium-manganese-nickel composite oxide ($Li_xMn_{2-y}Ni_yO_4$), lithium-manganese-cobalt composite oxide ($Li_xMn_yCo_{1-y}O_2$), lithium iron phosphate ($Li_xFePO_4$), lithium-nickel-cobalt-manganese composite oxide, and the like. Here, $0<x<1$ and $0<y<1$.

Especially, when a nonaqueous electrolyte containing a normal temperature molten salt is used, it is preferable to use lithium iron phosphate, $Li_xVPO_4F$, lithium-manganese composite oxide, lithium-nickel composite oxide, or lithium-nickel-cobalt composite oxide in terms of the cycle life. This is because the reactivity of the positive electrode active material with the normal temperature molten salt is decreased.

The positive electrode active material has preferably a particle size of primary particles of 100 nm to 1 μm. When the positive electrode active material has a particle size of primary particles of 100 nm or more, the handling becomes easy on the industrial production. When the positive electrode active material has a particle size of primary particles of 1 μm or less, it is possible that the diffusion of the lithium ions smoothly advance in the solid.

The positive electrode active material has preferably a specific surface area of 0.1 $m^2$/g to 10 $m^2$/g. When the positive electrode active material has a specific surface area of 0.1 $m^2$/g or more, the insertion and extraction sites of the lithium ions can be sufficiently secured. When positive electrode active material has a specific surface area of 10 $m^2$/g or less, the handling is easy on the industrial production, and the good charge and discharge cycle performance can be secured.

The binder, which is used for binding the positive electrode active material to the current collector, may include, for example, polytetrafluoroethylene (PTFE), polyvinylidene fluoride (PVdF), fluororubber, and the like.

In order to increase a current collecting performance and suppress a contact resistance with the current collector, if necessary, the conductive agent may be blended with the positive electrode. The conductive agent may include, for example, carbonaceous substances such as acetylene black, carbon black, and graphite.

With respect to the ratios of the positive electrode active material and binder which are blended, it is preferable that the ratio is adjusted to a range of 80% by weight to 98% by weight for the positive electrode active material and adjusted to a range of 2% by weight to 20% by weight for the binder. When the amount of the binder is adjusted to 2% by weight or more, the sufficient electrode strength can be obtained, and when it is adjusted to 20% by weight or less, the amount of the insulating material in the electrode can be decreased and the internal resistance can be decreased.

When the conductive agent is added, the addition effect of the conductive agent can be sufficiently obtained by adjusting the amount thereof to 3% by weight or more, and the decomposition of the nonaqueous electrolyte can be sufficiently decreased on the surface of the positive electrode conductive agent in storage at a high temperature by adjusting the amount thereof to 15% by weight or less.

The positive electrode is produced, for example, by suspending the positive electrode active material and the binder, and if necessary the conductive agent in an appropriate solvent to prepare slurry, coating the slurry on the positive electrode current collector, drying it to form a positive electrode active material-containing layer, and pressing it.

Alternatively, in the production of the positive electrode, pellets are formed from the positive electrode active material and the binder, and the conductive agent blended if necessary, which may be used as the positive electrode active material-containing layer.

(2) Negative Electrode

The negative electrode has a negative electrode current collector, and a negative electrode layer(s) (a negative electrode active material-containing layer(s)) supported on one side or both sides of the negative electrode current collector.

As the current collector, a material electrically stable at an insertion and extraction potential of the lithium in the negative electrode active material is used. It is preferable to produce the current collector from copper, nickel, stainless steel, or aluminum. The current collector has preferably a thickness of 5 to 20 μm. The current collector having the thickness described above can realize good balance between the strength and the weight reduction of the negative electrode.

The negative electrode layer may have a negative electrode active material, a conductive agent, and a binder. The binder can fill gaps in the dispersed negative electrode active material. The conductive agent can improve the battery performance and can suppress the contact resistance with the current collector.

The negative electrode active material may contain the electrode material for a battery according to the first embodiment.

As the negative electrode active material, only the electrode material for a battery according to the first embodiment may be used, or a mixture thereof with another negative electrode active material may be used. As the other negative electrode active material, particles of anatase-type titanium dioxide $TiO_2$, particles of ramsdellite-type lithium titanate $Li_2Ti_3O_7$, particles of spinel type lithium titanate $Li_4Ti_5O_{12}$ are preferable, because their specific gravities thereof are close to the negative electrode active material according to the first embodiment and the mixing property and the dispersibility are good. One sort of the other negative electrode active material may be used alone or two sorts or more may be used in combination.

The content of the negative electrode active material can be adjusted to 70% by weight to 98% by weight in the negative electrode layer.

The conductive agent may include, for example, carbonaceous substances such as acetylene black, carbon black, graphite, carbon nanotube, and carbon nanofiber.

The binder may include, for example, polytetrafluoroethylene (PTFE), polyvinylidene fluoride (PVdF), fluororubber, styrene-butadiene rubber, and the like.

It is preferable that the binder is blended in a content within a range of 2% by weight to 30% by weight in the negative electrode layer. When the content of the binder is 2% by weight or more, the binding property between the negative electrode layer and the current collector is sufficient, and thus the excellent cycle characteristic can be expected. On the other hand, the content of the binder is preferably 30% by weight or less in terms of the increased capacity. It is also preferable to blend the conductive agent in a content of 30% by weight or less in the negative electrode layer.

The negative electrode is produced, for example, by suspending the negative electrode active material, the binder and the conductive agent in a solvent generally used to prepare slurry, coating the resulting slurry on the current collector, drying it to form a negative electrode layer, and pressing it.

Alternatively, in the production of the negative electrode, pellets are formed from the negative electrode active material, the binder, and the conductive agent, which may be used as the negative electrode layer.

(3) Nonaqueous Electrolyte

Examples of the nonaqueous electrolyte may include liquid nonaqueous electrolyte prepared by dissolving electrolyte in an organic solvent, gelatinous nonaqueous electrolyte in which the liquid electrolyte is conjugated with a polymer material, and the like.

The liquid nonaqueous electrolyte is prepared, for example, by dissolving the electrolyte in an organic solvent in a concentration of 0.5 mole/L to 2.5 mole/L.

The electrolyte may include, for example, lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bis-trifluoromethylsulfonylimide [$LiN(CF_3SO_2)_2$], and mixtures thereof. The electrolyte which is not easily oxidized even at a high potential is preferable, and $LiPF_6$ is most preferable.

The organic solvent may include, for example, cyclic carbonates such as propylene carbonate (PC), ethylene carbonate (EC) and vinylene carbonate; linear carbonates such as diethyl carbonate (DEC), dimethyl carbonate (DMC), and methylethyl carbonate (MEC); cyclic ethers such as tetrahydrofuran (THF), 2-methyl tetrahydrofuran (2Me THF), and dioxolane (DOX); linear ethers such as dimethoxyethane (DME) and diethoxyethane (DEE); γ-butyrolactone (GBL), acetonitrile (AN), and sulpholane (SL), they being used alone or as a mixture.

The polymer material may include, for example, polyvinylidene fluoride (PVdF), polyacrylonitrile (PAN), polyethylene oxide (PEO), and the like.

As the nonaqueous electrolyte, a normal temperature molten salt (ionic melt) containing lithium ions, a polymer solid electrolyte, or an inorganic solid electrolyte may be used.

The normal temperature molten salt (an ionic melt) refers to a compound which can exist in a liquid state at a normal temperature (from 15 to 25° C.) among organic salts of combination of an organic cation and an anion. The normal temperature molten salt may include normal temperature molten salts, which exist in the liquid state as they are, normal temperature molten salts, which are in the liquid state by mixing with electrolyte, normal temperature molten salts, which are in the liquid state by dissolving in an organic solvent, and the like. The normal temperature molten salt, which is generally used in the nonaqueous electrolyte battery, has a melting point of 25° C. or lower. The organic cation has generally a quaternary ammonium skeleton.

The polymer solid electrolyte is prepared by dissolving and solidifying a polymer material in electrolyte.

The inorganic solid electrolyte is a solid substance having a lithium ion conductivity.

(4) Separator

Examples of the separator may include porous films containing polyethylene, polypropylene, cellulose or polyvinylidene fluoride (PVdF), non-woven fabric made of a synthetic resin, and the like. Of these, the porous film containing the polyethylene or the polypropylene are preferable in terms of the improved safety, because they can melt at a given temperature and can cut off the current.

(6) Exterior Member

As an exterior member, for example, a laminate film having a thickness of 0.5 mm or less, or a metal container having a thickness of 1 mm may be used. The laminate film has more preferably a thickness of 0.2 mm or less. The metal container has more preferably a thickness of 0.5 mm or less, even more preferably 0.2 mm or less.

The shape of the exterior member may include a flat-type (thin), a square-type, a cylindrical type, a coin-type, a button-type, and the like. Depending on the battery size, for example, an exterior member for a compact battery mounted on a portable electronic device, or an exterior member for a large scale battery mounted on an automobile of two-wheel to four-wheel vehicle may be used.

As the laminate film, a multi-layer film in which a metal layer is inserted between resin films may be used. As the metal layer is preferable an aluminum foil or an aluminum alloy foil in order to reduce the weight. As the resin film, for example, a polymer material such as polypropylene (PP), polyethylene (PE), nylon, or polyethylene terephthalate (PET) may be used. The laminate film may be sealed by heat-sealing and formed into a shape of the exterior member.

The metal container may be formed, for example, from aluminum or aluminum alloy. Alloy containing an element of magnesium, zinc, and/or silicon is preferable as the aluminum alloy. In the aluminum or the aluminum alloy, it is preferable that a transition metal such as iron, copper, nickel, and/or chromium is contained in a content of 1% or less, whereby the long-term reliability and the heat dissipation can be remarkably improved under a high temperature circumstance.

(7) Positive Electrode Terminal and Negative Electrode Terminal

The negative electrode terminal can be formed from a material which is electrochemically stable at an insertion and extraction potential of Li in the negative electrode active material described above and has electric conductivity. Specifically, the material may include copper, nickel, stainless steel, aluminum, and the like. In order to decrease the contact resistance, it is preferable to use the same material as that of the negative electrode current collector.

The positive electrode terminal can be produced from a material which is electrically stable at a potential range of 3 V to 5 V based on lithium ion metal and has electric conductivity. Specifically, the material may include aluminum alloy containing an element of Mg, Ti, Zn, Mn, Fe, Cu and/or Si, and aluminum. In order to decrease the contact resistance, it is preferable to use the same material as that of the positive electrode current collector.

Next, one example of the nonaqueous electrolyte batteries according to the second embodiment is specifically explained referring to FIG. 7 and FIG. 8.

FIG. 7 is a cross-sectional schematic view showing one example of the nonaqueous electrolyte batteries according to the second embodiment.

FIG. 8 is an enlarged view of a part A in FIG. 7.

As shown in FIG. 7, a flat-type nonaqueous electrolyte battery 10 has a flat wound electrode group 1, and a bag-shaped exterior member 2 housing it. The bag-shaped exterior member 2 is formed of a laminate film in which a metal layer is inserted between two resin films.

The flat wound electrode group 1 is formed by spirally winding a laminate in which a negative electrode 3, a separator 4, a positive electrode 5 and a separator 4 are laminated in this order from the outside, and subjecting the laminate to a press molding. The outermost layer of the negative electrode 3 has, as shown in FIG. 7, a structure in which a negative electrode layer 3b is formed on one side of the inner surface of the negative electrode current collector 3a, and other negative electrode 3 is configured to form negative electrode layers 3b on both sides of the negative electrode current collector 3a. The positive electrode 5 is configured to form positive electrode layers 5b on both sides of the positive electrode current collector 5a.

In a vicinity of an outer circumferential end of the wound electrode group 1, a negative electrode terminal 6 is connected to the negative electrode current collector 3a of the negative electrode 3 in the outermost layer, and a positive electrode terminal 7 is connected to the positive electrode current collector 5a positive electrode 5 in the inside. The negative electrode terminal 6 and the positive electrode terminal 7 extend from an opening of the bag-shaped exterior member 2 to the outside. For example, liquid nonaqueous electrolyte is injected from the opening of the bag-shaped exterior member 2. The wound electrode group 1 and the liquid nonaqueous electrolyte are completely sealed by heat-sealing the opening of the bag-shaped exterior member 2, the negative electrode terminal 6 and the positive electrode terminal 7 being caught in the opening.

Figure 9:
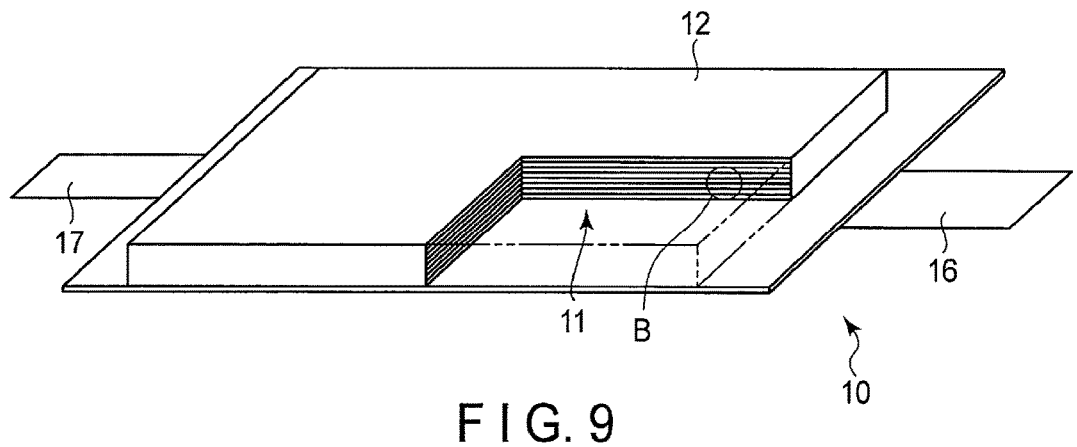
FIG. 9 is a partially cutaway perspective view schematically showing another example of the nonaqueous electrolyte battery according to the second embodiment.
Figure 10:
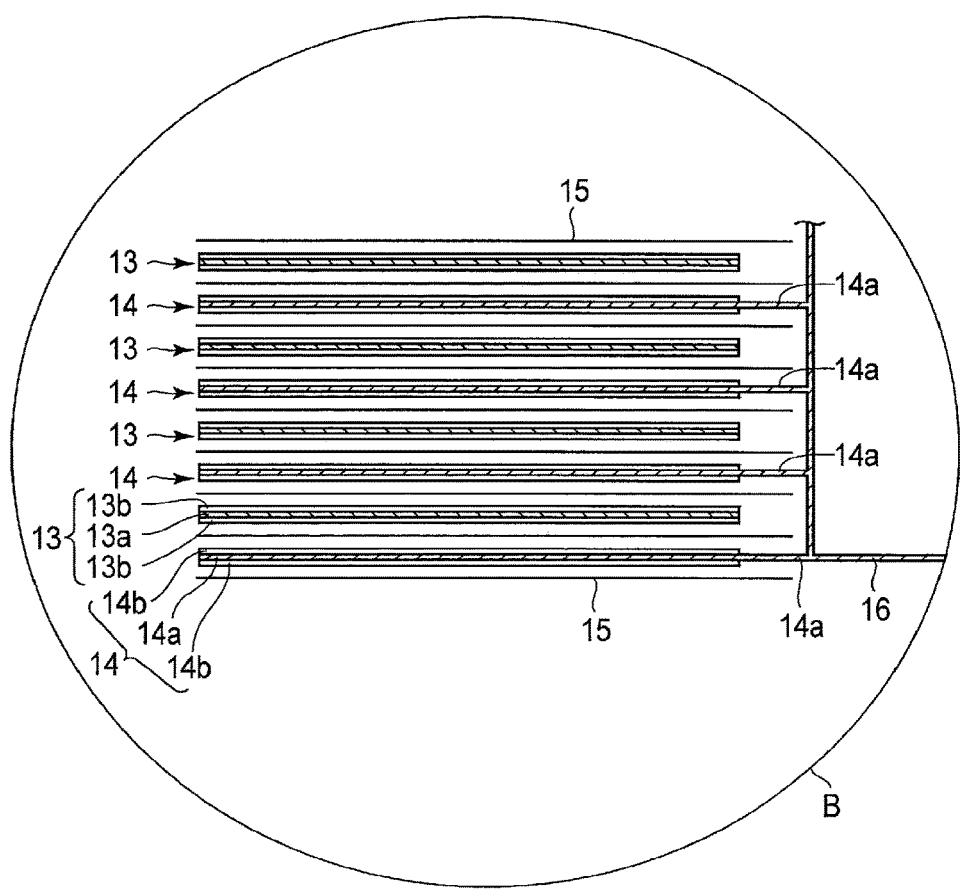
FIG. 10 is an enlarged view of a part B in FIG. 9.

The nonaqueous electrolyte battery according to the second embodiment is not limited to one having the structure shown in FIG. 7 and FIG. 8 described above, and it may have a structure, for example, shown in FIG. 9 and FIG. 10.

FIG. 9 is a partially cutaway perspective view schematically showing another example of the nonaqueous electrolyte battery according to the second embodiment.

FIG. 10 is an enlarged view of a part B in FIG. 9.

The flat-type nonaqueous electrolyte battery 10, shown in FIG. 2, has a laminate-type electrode group 11, and an exterior member 12 housing it. The exterior member 12 is formed of a laminate film in which a metal layer is inserted between two resin films.

The laminate-type electrode group 11 has, as shown in FIG. 10, a structure in which positive electrodes 13 and negative electrodes 14 are alternatively laminated, a separator 15 being inserted between them. There are multiple positive electrodes 13, and each of them contains a current collector 13a and positive electrode active material-containing layers 13b supported on both sides of the current collector 13a. There are multiple negative electrodes 14, and each of them contains a current collector 14a and negative electrode active material-containing layers 14b supported on both sides of the current collector 14a. One side of the current collector 14a in each negative electrode 14 protrudes from the positive electrode 13. The protruding current collector 14a is electrically connected to the belt-shaped negative electrode terminal 16. A tip of the belt-shaped negative electrode terminal 16 is drawn out from the exterior member 11 to the outside. In the current collector 13a of the positive electrode 13, a side located on the opposite of the protruding side of the current collector 14a protrudes from the negative electrode 14, which is not shown though. The current collector 13a protruding from the negative electrode 14 is electrically connected to the belt-shaped positive electrode terminal 17. The tip of the belt-shaped positive electrode terminal 17 is located at the opposite side of the negative electrode terminal 16, and is drawn out from the side of the exterior member 11.

The nonaqueous electrolyte battery according to the second embodiment contains the electrode material for a battery according to the first embodiment, and thus it can show the excellent battery capacity and cycle life.

Third Embodiment

According to a third embodiment, a battery pack is provided. The battery pack includes a nonaqueous electrolyte battery according to the second embodiment.

The battery pack according to the third embodiment may contain multiple nonaqueous electrolyte batteries. The nonaqueous electrolyte batteries may be electrically connected in series, in parallel, or with a combination of series connection and parallel connection to form a battery module.

The battery pack according to the third embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise an power distribution external terminal. The power distribution external terminal is configured to externally output the current from the nonaqueous electrolyte battery, and to input the current to the nonaqueous electrolyte battery. In other words, when the battery pack is used as a power source, the current is externally provided via the power distribution external terminal. Also, when the battery pack is charged, the charging current (including regenerative energy caused by power of vehicles such as automobiles) is provided to the battery pack via the power distribution external terminal.

One example of the battery pack according to the third embodiment is explained below referring to FIG. 11 and FIG. 12.

Figure 11:
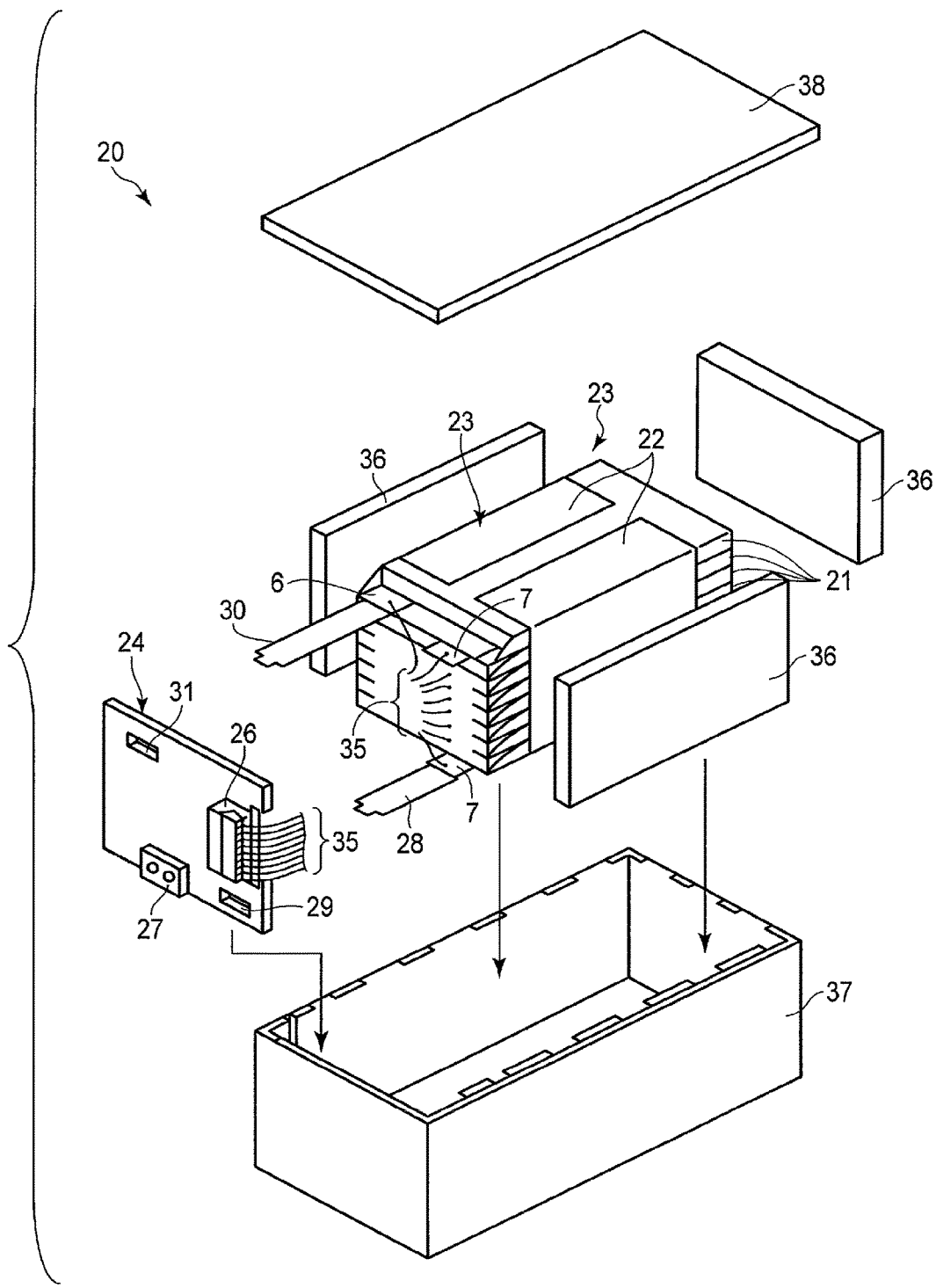
FIG. 11 is an exploded perspective view showing one example of battery packs according to a third embodiment.

FIG. 11 is an exploded perspective view showing one example of battery packs according to the third embodiment. FIG. 12 is a block diagram showing an electric circuit of the battery pack in FIG. 11.

Figure 12:
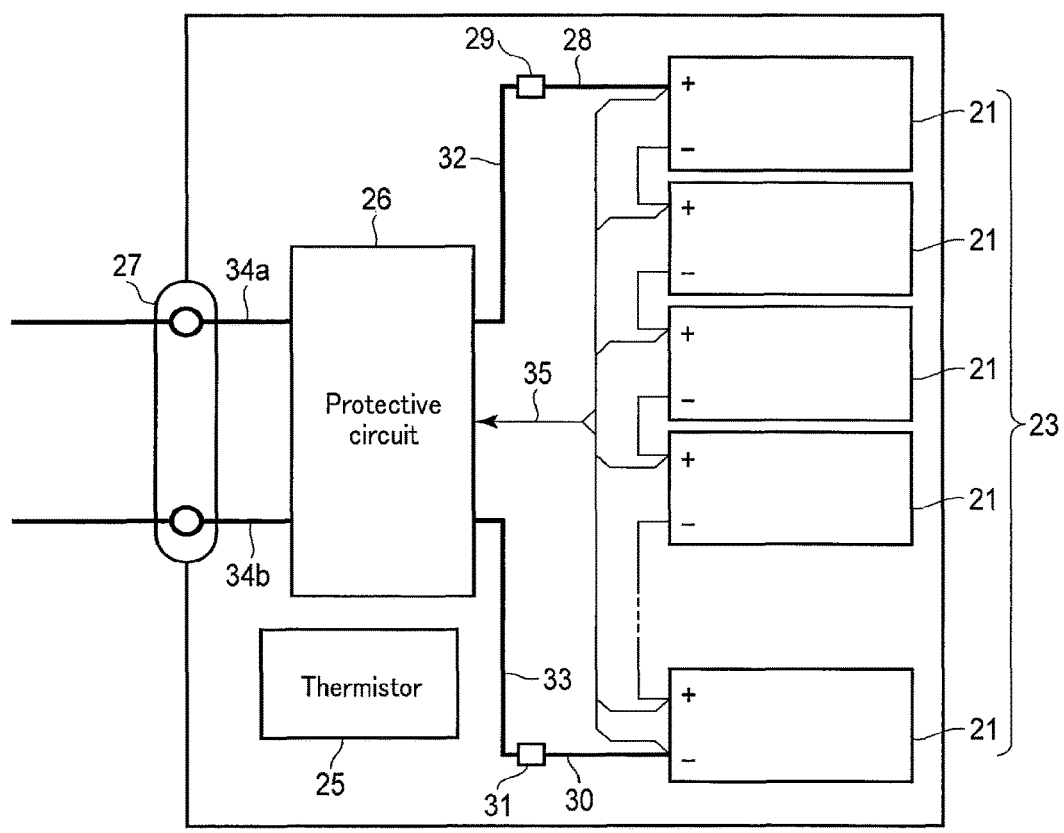
FIG. 12 is a block diagram showing an electric circuit of the battery pack in FIG. 11.

A battery pack 20, shown in FIG. 11 and FIG. 12, contains multiple unit cells 21. The unit cell 21 is the flat-type nonaqueous electrolyte battery explained referring to FIG. 7 and FIG. 8.

The multiple unit cells 21 are laminated so that a negative electrode terminal 6 and a positive electrode terminal 7, which extend outward, are arranged in the same direction, which is fastened with a pressure sensitive adhesive tape 22 to configure a battery module 23. These unit cells 21 are, as shown in FIG. 12, electrically connected to each other in series.

A printed wiring board 24 is disposed so as to face a side surface from which a negative electrode terminal 6 and a positive electrode terminal 7 of the unit cells 21 extend. As shown in FIG. 12, a thermistor 25, a protective circuit 26, and a terminal 27 for conducting electricity to an external device are mounted on the printed wiring board 24. An insulating plate (not shown) is attached to a surface of the printed wiring board 24 facing the battery module 23, in order to avoid an unnecessary contact of wirings of the battery module 23.

A positive electrode side lead 28 is connected to the positive electrode terminal 7 located on the undermost layer of the battery module 23, and the tip thereof is inserted into a positive electrode side connector 29 of the printed wiring board 24 and electrically connected thereto.

A negative electrode side lead 30 is connected to the negative electrode terminal 6 located on the uppermost layer of the battery module 23, and the tip thereof is inserted into a negative electrode side connector 31 of the printed wiring board 24 and electrically connected thereto. The connectors 29 and 31 are connected to the protective circuit 26 through wires 32 and 33 formed on the printed wiring board 24.

The thermistor 25 detects a temperature of the unit cells 21, and the detected signals are sent to the protective circuit 26. The protective circuit 26 can block a plus-side wiring 34*a* and a minus-side wiring 34*b* between the protective circuit 26 and the terminal 27 for conducting electricity to the external device in a certain condition. One example of the certain condition is, for example, a case where the thermistor 25 detects a temperature equal to or higher than a pre-determined temperature. Another example of the certain condition is, for example, a case where an over-charge, an over-discharge, or an over current is detected in the unit cells 21. The detection of the over-charge, or the like, are performed in each unit cell 21 or in the whole battery module 23. When the detection is performed in each unit cell 21, a battery voltage may be detected, or a positive electrode potential or a negative electrode potential may be detected. In the latter case, a lithium electrode, which is used as a reference electrode, is inserted into each unit cells 21. In the case of FIG. 11 and FIG. 12, a wiring 35 for detection of a voltage is connected to each unit cell 21. The detection signals are sent to the protective circuit 26 through the wirings 35.

A protective sheet 36 formed of rubber or a resin is disposed on three side surfaces of the battery module 23 other than the surface from which the positive electrode terminal 7 and the negative electrode terminal 6 protrude.

The battery module 23 is housed in a storage container 37 together with each protective sheet 36 and the printed wiring board 24. Specifically, the protective sheets 36 are disposed on both inner surfaces in a long side direction and on one inner surface in a short side direction of the storage container 37, and the printed wiring board 24 is disposed on the opposite inner surface in the short side direction. The battery module 23 is located in a space surrounded by the protective sheets 36 and the printed wiring board 24. A lid 38 is attached to an upper surface of the storage container 37.

For fixing the battery module 23, a heat-shrinkable tape may be used instead of the pressure sensitive adhesive tape 22. In that case, the protective sheets are disposed on both sides of the battery module, the module is surrounded by a heat-shrinkable tube, and then the heat-shrinkable tube is heat-shrunk to bind the battery module.

In FIG. 11 and FIG. 12, the embodiment in which the unit cells 21 are connected in series is shown, the unit cells may be connected in parallel in order to increase the battery capacity. The assembled battery packs may also be connected in series and/or in parallel.

The mode of the battery pack according to the third embodiment may be appropriately varied. The battery pack according to the third embodiment is preferably applied to uses in which the cycle characteristic with a large current characteristic is desired. The specific use may include such as a use for a power source for a digital camera, a use for two-whole to four-whole hybrid electric automobiles, a use for two-whole to four-whole electric automobiles, and a use for assist bicycles. The battery pack according to the third embodiment is particularly preferably applied to uses for automobile.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and electric trains.

The battery pack according to the third embodiment contains the nonaqueous electrolyte battery according to the second embodiment, and thus it can show the excellent battery capacity and cycle life.

Fourth Embodiment

According to a fourth embodiment, a vehicle is provided. The vehicle includes a battery pack according to the third embodiment.

Figure 13:
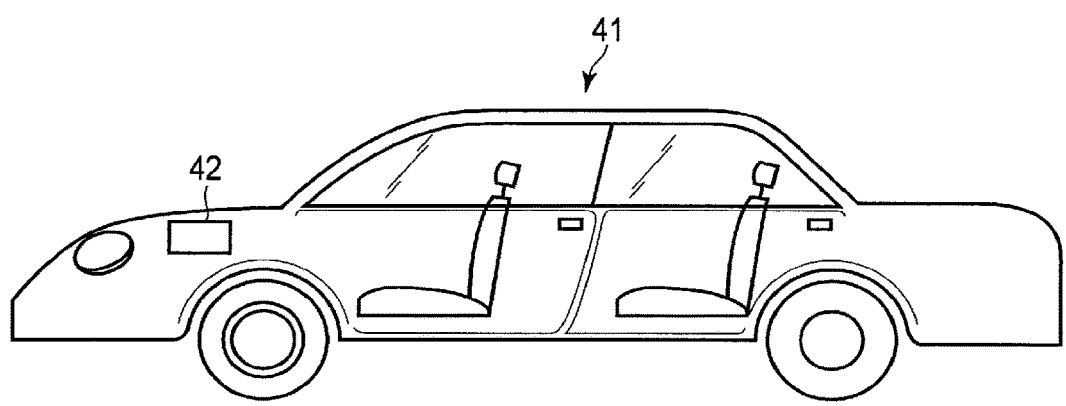
FIG. 13 shows an example of a vehicle according to a fourth embodiment.

FIG. 13 shows an example of an automobile which includes a battery pack according to a third embodiment.

The automobile 41 shown in FIG. 13 includes a battery pack 42 which is an example of the battery pack according to the third embodiment mounted in its engine room. The mounting position is not limited to engine rooms. For example, the battery pack may also be mounted in rear parts of automobiles or under seats.

Example

Examples are explained in more detailed below.

An identification of a crystal phase obtained by a reaction and a presumption of the of the crystal structure were performed according to the powder X-ray diffraction method using Cu-Kα rays, the cross-sectional TEM observation, and the electron beam diffraction measurement in the same manner as in the methods described in the first embodiment. The BET specific surface area measurement was performed according to the BET method described in the first embodiment. In each Synthesis Example, a composition of each produce was analyzed according to the ICP method, and it was confirmed to obtain a desired product. In addition the number of solid acid points on the surface of each sample was compared from an infrared absorption spectrum measurement according to a pyridine adsorption method.

Synthesis Example 1

A commercially available regent, a potassium titanate ($K_2Ti_4O_9$) powder having an average particle size of 10 μm was prepared. The prepared potassium titanate was one which had been previously washed with pure water to remove impurities from the potassium titanate. To 1 L of a hydrochloric acid solution having a concentration of 1 M was added 10 g of the potassium titanate prepared, and the mixture was stirred for 240 hours to exchange potassium ions into protons. In this acid treatment, the hydrochloric acid solution was changed to a fresh hydrochloric acid solution every 24 hours so that the proton exchange was performed as complete as possible. The amount of the alkali cations remaining in the proton-exchanged product was adjusted to 2% by mole or less. Thus, the proton-exchanged product ($H_2Ti_4O_9$) powder was obtained. The obtained proton-exchanged product was washed with pure water, and dried with a freeze-dryer to recover it in a powder state. Then, the proton-exchanged product ($H_2Ti_4O_9$) powder was stirred in an aqueous lithium hydroxide solution, whereby a part of protons in the proton-exchanged product was exchanged to Li ions. In order to securely perform the exchange with the lithium ion, the dispersion was heated to 40° C., and stirring was performed.

A part of a product obtained by performing the stirring for one hour, 24 hours, 100 hours, or 336 hours was taken out, and they were washed with water and dried using the freeze-dryer to recover them in the powder state. From the ICP measurement of the obtained powders, it was clear that a part of the protons in $H_2Ti_4O_9$ was exchanged to lithium depending on the increase of the stirring treatment time. Specifically, an exchange amount X between proton and lithium in the general formula: $H_{2-x}Li_xTi_4O_9$ was, as shown in Table 1 below, 0.11 for the one hour-stirring, 0.24 for the 24 hour-stirring, 0.57 for the 100 hour-stirring, or 0.68 for the 336 hour-stirring.

As a result of the confirmation by the powder X-ray diffraction (XRD), the obtained lithium-substituted product, $H_{2-x}Li_xTi_4O_9$, had a layered structure of the crystal phase.

Next, the obtained lithium-substituted product, $H_{2-x}Li_xTi_4O_9$, was divided into 5 samples. The thus obtained 5 samples were subjected to a heat-treatment for 2 hours at a temperature of 300° C., 400° C., 550° C., 800° C., and 900° C. Thus, the composite oxide powders were obtained.

[Analysis]

In order to confirm the composition of the obtained composite oxide powder, the powder X-ray diffraction measurement was performed using Cu-Kα rays as a source. The measurement conditions were: a step width 2θ=0.02 deg, a tube voltage=40 kV, and a tube current=300 mA. The measurement time was adjusted so that a main peak reached about 5000 to 10000 cps, depending on the state of the sample.

In order to confirm the crystal structure of the obtained composite oxide powder, the cross-sectional TEM observation and the electron beam diffraction measurement of the particles were performed using ion milling according to the method described above. The phase of the monoclinic titanium dioxide, the phase of the spinel type lithium titanate, and the other phases can be easily distinguished by previously simulating the electron beam diffraction patterns. From the powder X-ray diffraction results of the whole particles, an average structure of the whole particles can be known. A peak intensity corresponding to each composition in the chart obtained by the powder X-ray diffraction measurement was classified into 3 grades of strong, moderate, and weak, based on a peak intensity of $TiO_2$ (B), which was not subjected to the Li exchange treatment and was heated at 400° C. for one hour.

The results obtained from the analyses are shown in Table 1 and Table 2 below.

TABLE 1

Synthesis Example 1

| | | Non-heating crystal phase | Heat-treatment condition (temperature) | | | | |
|---|---|---|---|---|---|---|---|
| | | | A. 300° C. | B. 400° C. | C. 500° C. | D. 800° C. | E. 900° C. |
| (stirring time/Li exchange amount X) Acid treatment conditions | (i) 1 hour/ X = 0.11 | Layered structure | $TiO_2$(B) Weak (Comparative Example 1) | $TiO_2$(B) Moderate (Comparative Example 2) | $TiO_2$(B) Strong, LTO Weak (Example 1) | $TiO_2$(B) Strong, Anatase-type Weak, LTO Weak (Comparative Example 3) | $TiO_2$(B) Weak, Anatase-type Strong, LTO Weak (Comparative Example 4) |
| | (ii) 4 hour/ X = 0.24 | Layered structure | $TiO_2$(B) Weak (Comparative Example 5) | $TiO_2$(B) Moderate (Comparative Example 6) | $TiO_2$(B) Strong, LTO Weak (Example 2) | $TiO_2$(B) Moderate, Anatase-type Weak, LTO Weak (Comparative Example 7) | $TiO_2$(B) Weak, Anatase-type Strong, LTO Weak (Comparative Example 8) |
| | (iii) 100 hour/ X = 0.57 | Layered structure | $TiO_2$(B) Weak (Comparative Example 9) | $TiO_2$(B) Moderate, LTO Weak (Example 3) | $TiO_2$(B) Strong, LTO Moderate (Example 4) | $TiO_2$(B) Moderate, LTO Moderate (Example 5) | $TiO_2$(B) Weak, Anatase-type Strong, LTO Weak (Comparative Example 10) |
| | (iv) 336 hour/ X = 0.68 | Layered structure | $TiO_2$(B) Weak (Comparative Example 11) | $TiO_2$(B) Moderate, LTO Weak (Example 6) | $TiO_2$(B) Strong, LTO Strong (Example 7) | $TiO_2$(B) Moderate, LTO Strong (Example 8) | LTO Strong (Comparative Example 12) |

*$TiO_2$ (B): monoclinic titanium dioxide, LTO: spinel type lithium titanate, Anatase-type: anatase-type titanium dioxide "Strong," "Moderate" and "Weak" express a relative intensity of a peak belonging in each crystal phase in a powder X-ray diffraction chart of each sample.

TABLE 2

| | Structure |
|---|---|
| Example 1 | FIG. 4 |
| Example 2 | FIG. 4 |
| Example 3 | FIG. 4 |
| Example 4 | FIG. 4 |
| Example 5 | FIG. 4 |
| Example 6 | FIG. 4 |
| Example 7 | FIG. 4 |
| Example 8 | FIG. 4 |

From the results of the analyses, it was found that the samples of Examples 1 to 8 described in Table 1 had the same structure as that shown in FIG. 4. The samples of Examples 1 to 8, accordingly, contained the active material particles 100, which were the primary particles containing the phase of the monoclinic titanium dioxide and the phase of the spinel type lithium titanate, in which a part of the phase of the spinel type lithium titanate was dispersed on the surface of the active material particle 100. The active material particles 100 of the samples of Examples 1 to 8, therefore, contained the core part 110 containing a part of the phase of the monoclinic titanium dioxide, the intermediate part 120, which surrounded the core part 110, and contained a part of the phase of the monoclinic titanium dioxide and a part of the phase of the spinel type lithium titanate, and the shell part 130, which surrounded the intermediate part 120 and contained a part of the phase of the spinel type lithium titanate.

On the other hand, the samples of Comparative Examples 1, 2, 5, 6, 9 and 11 described in Table 1 did not contain the spinel type lithium titanate. The samples of Comparative Example 1, 2, 5, 6, 9 and 11, therefore, did not contain the intermediate part 120 and the shell part 130 described above.

The samples of Comparative Examples 3, 4, 7, 8 and 10 described in Table 1 did not contain the intermediate part 120 described above, but contained the anatase-type crystal phase, produced by the dehydration reaction of $TiO_2$ (B), instead of the intermediate part. There is the crystal phase containing the anatase-type titanium dioxide at the interface between the phase of the monoclinic titanium dioxide and the phase of the spinel type lithium titanate, and thus the phase of the monoclinic titanium dioxide is not brought into contact with the phase of the spinel type lithium titanate.

The sample obtained in Synthesis Example 1 had a primary particle size within a range of 1 μm to 5 μm. All samples obtained had a BET specific surface area of about 10 m²/g.

Synthesis Example 2

Synthesis Example 2-1

In 50 ml of a 1 mol/L aqueous lithium hydroxide solution was dispersed 2 g of titanium dioxide having an average particle size of 5 μm. The obtained dispersion was heated with pressure at 180° C. for 12 hours using an autoclave equipped with a 200 ml container.

Thus, a precursor in which a part of the proton titanate compound was substituted by lithium was synthesized. In the obtained precursor of the general formula: $H_{2-x}Li_xTi_4O_9$, the proton-lithium exchange amount X was 0.35. As a result of the confirmation by the powder X-ray diffraction (XRD), the obtained precursor had a layered structure of the crystal phase.

The synthesized precursor was divided into 5 samples. The 5 samples were subjected to a heat-treatment for 2 hours at a temperature of 300° C., 400° C., 550° C., 800° C., and 900° C. Thus, the composite oxide powders were obtained.

Synthesis Example 2-2

A precursor in which a part of the proton titanate compound was substituted by lithium was synthesized in the same manner as in Synthesis Example 2-1 except that a 3 mol/L aqueous lithium hydroxide solution was used. In the general formula: $H_{2-x}Li_xTi_4O_9$, the proton-lithium exchange amount X was 0.86. As a result of the confirmation by the powder X-ray diffraction (XRD), the obtained precursor had a layered structure of the crystal phase.

The synthesized precursor was divided into 5 samples. The 5 samples were subjected to a heat-treatment for 2 hours at a temperature of 300° C., 400° C., 550° C., 800° C., and 900° C. Thus, the composite oxide powders were obtained.

[Analysis]

The samples obtained in Synthesis Examples 2-1 and 2-2 were subjected to the XRD measurement, the cross-sectional TEM observation of the particles using the ion milling, and the electron beam diffraction measurement in the same manner as in Synthesis Example 1. The results obtained from the analyses are shown in Table 3 and Table 4.

TABLE 3

| | | Synthesis Example 2 | | | | | |
|---|---|---|---|---|---|---|---|
| | | Non-heating crystal phase | Heat-treatment condition (temperature) | | | | |
| | | | A. 300° C. | B. 400° C. | C. 550° C. | D. 800° C. | E. 900° C. |
| (concentration of lithium hydroxide/Li exchange amount X) Acid treatment conditions | (Synthesis Example 2-1) 1 mol/L X = 0.35 | amorphous | $TiO_2$(B) Weak (Comparative Example 13) | $TiO_2$(B) Moderate, LTO Weak (Example 9) | $TiO_2$(B) Moderate, LTO Moderate (Example 10) | LTO Strong (Comparative Example 14) | LTO Strong (Comparative Example 15) |
| | (Synthesis Example 2-2) 3 mol/L X = 0.86 | amorphous | $TiO_2$(B) Weak (Comparative Example 16) | $TiO_2$(B) Weak, LTO Strong (Example 11) | LTO Strong (Comparative Example 17) | LTO Strong (Comparative Example 18) | LTO Strong (Comparative Example 19) |

*$TiO_2$ (B): monoclinic titanium dioxide, LTO: spinel type lithium titanate, Anatase-type: anatase-type titanium dioxide "Strong," "Moderate" and "Weak" express a relative intensity of a peak belonging in each crystal phase in a powder X-ray diffraction chart of each sample.

TABLE 4

| | Structure |
|---|---|
| Example 9 | FIG. 4 |
| Example 10 | FIG. 4 |
| Example 11 | FIG. 4 |

From the analysis results shown in Table 3 and Table 4, it was found that the samples of Examples 9 to 11 described in Table 3 had the same structure as that shown in FIG. 4. The samples of Examples 9 to 11, accordingly, contained the active material particles, which were the primary particles containing the phase of the monoclinic titanium dioxide and the phase of the spinel type lithium titanate, in which a part of the phase of the spinel type lithium titanate was dispersed on the surface of the active material particle. The active material particles of the samples of Examples 9 to 11, therefore, contained the core part 110 containing a part of the phase of the monoclinic titanium dioxide, the intermediate part 120, which surrounded the core part 110, and contained a part of the phase of the monoclinic titanium dioxide and a part of the phase of the spinel type lithium titanate, and the shell part 130, which surrounded the intermediate part 120 and contained a part of the phase of the spinel type lithium titanate.

On the other hand, the samples of Comparative Examples 13 and 16 described in Table 3 did not contain the spinel type lithium titanate. The samples of Comparative Examples 13 and 16, therefore, did not contain the intermediate part 120 and the shell part 130 described above.

The samples of Comparative Examples 14, 15, 17, 18 and 19 described in Table 3 did not contain the monoclinic titanium dioxide, and only the spinel type lithium titanate was observed.

The sample obtained in Synthesis Example 2 had a primary particle size within a range of 200 nm to 1 µm. All samples obtained had a BET specific surface area of about 100 m²/g.

Synthesis Example 3

A commercially available regent, a potassium titanate ($K_2Ti_4O_9$) powder having an average particle size of 10 µm was prepared, as in Synthesis Example 1. The prepared potassium titanate was one which had been previously washed with pure water to remove impurities from the potassium titanate. To 1 L of a hydrochloric acid solution having a concentration of 1 M was added 10 g of the potassium titanate prepared, and the mixture was stirred for 240 hours to exchange potassium ions into protons. In this acid treatment, the hydrochloric acid solution was changed to a fresh hydrochloric acid solution every 24 hours so that the proton exchange was completely performed. Thus, the proton-exchanged product ($H_2Ti_4O_9$) powder was obtained. The obtained proton-exchanged product was washed with pure water, and dried with a freeze-dryer to recover it in a powder state. The powder was heated at 400° C. for 2 hours to obtain monoclinic titanium dioxide ($TiO_2$ (B)).

Next, in order to synthesize $Li_4Ti_5O_{12}$, 100 ml of a sol-gel solution in which titanium tetraisopropoxide and lithium acetate were mixed in a molar ratio of Li:Ti of 4:5 was prepared. After the solution was diluted with isopropyl alcohol in 5 times, 10 g of the monoclinic titanium dioxide ($TiO_2$ (B)) was immersed in the solution, and a pressure in a chamber was reduced, whereby the sol-gel solution was forced to penetrate into the surface of the monoclinic titanium dioxide particles. After that, the excessive sol-gel solution was separated by filtration, and then the particles were allowed to stand in the atmosphere for 12 hours. Subsequently, the particles were dried at 90° C. in a vacuum reduced pressure.

After the drying, the obtained particles were subjected to the powder X-ray diffraction and the electron beam diffraction according to TEM. As a result of the confirmation, it was found that there was an amorphous phase around the crystal of $TiO_2$ (B).

The particles were divided into 5 samples. The thus obtained 5 samples were subjected to heating for 2 hours at a temperature of 300° C., 400° C., 550° C., 800° C., and 900° C. Thus, the composite oxide powders were obtained. The obtained composite oxide powders were granulated to form secondary particles.

The obtained secondary particles were subjected to the powder X-ray diffraction measurement, the ICP measurement, the cross-sectional TEM observation of the particles using ion milling, and the electron beam diffraction measurement, as in Synthesis Example 1. The results obtained from these analyses are shown in Table 5 and Table 6 below.

TABLE 5

Synthesis Example 3

| Non-heating crystal phase | Heating condition (temperature) | | | | |
|---|---|---|---|---|---|
| | A. 300° C. | B. 400° C. | C. 550° C. | D. 800° C. | E. 900° C. |
| amorphous + $TiO_2(B)$ | $TiO_2(B)$ Strong (Comparative Example 20) | $TiO_2(B)$ Strong, LTO Moderate (Example 12) | $TiO_2(B)$ Strong, LTO Moderate (Example 13) | $TiO_2(B)$ Moderate, Anatase-type Weak, LTO Moderate (Comparative Example 21) | Anatase-type Strong, LTO Moderate (Comparative Example 22) |

* $TiO_2$ (B): monoclinic titanium dioxide, LTO: spinel type lithium titanate, Anatase-type: anatase-type titanium dioxide "Strong," "Moderate" and "Weak" express a relative intensity of a peak belonging in each crystal phase in a powder X-ray diffraction chart of each sample.

TABLE 6

| | Structure |
|---|---|
| Example 12 | FIG. 6 |
| Example 13 | FIG. 6 |

From the analysis results shown in Table 5 and Table 6, it was found that the samples of Examples 12 and 13 described in Table 5 had the same structure as that shown in FIG. 6. The samples of Examples 12 and 13, accordingly, contained the active material particles, which were the secondary particles formed by aggregating the primary particles containing the phase of the monoclinic titanium dioxide and the phase of the spinel type lithium titanate, in which a part of the phase of the spinel type lithium titanate was dispersed on the surface of each primary particle. The active material particles of the samples of Examples 12 and 13, therefore, were the secondary particles formed of the primary particles containing the core part 110 containing a part of the phase of the monoclinic titanium dioxide, the intermediate part 120, which surrounded the core part 110, and contained the monoclinic titanium dioxide and the spinel type lithium titanate, and the shell part 130, which surrounded the intermediate part 120 and contained the spinel type lithium titanate.

On the other hand, the sample of Comparative Example 20 described in Table 5 did not contain the spinel type lithium titanate. The sample of Comparative Example 20, therefore, did not contain the intermediate part 120 and the shell part 130 described above.

The sample of Comparative Example 21 described in Table 5 did not contain the intermediate part 120 described above, but contained the anatase-type crystal phase, produced by the dehydration reaction of $TiO_2$ (B), instead of the intermediate part. There is the crystal phase containing the anatase-type titanium dioxide at the interface between the phase of the monoclinic titanium dioxide and the phase of the spinel type lithium titanate, and thus the phase of the monoclinic titanium dioxide is not brought into contact with the phase of the spinel type lithium titanate.

The sample of Comparative Example 22 described in Table 5 did not contain the monoclinic titanium dioxide.

The sample obtained in Synthesis Example 3 had a primary particle size within a range of 1 μm to 10 μm, and a BET specific surface area of about 30 m²/g.

Synthesis Example 4

A commercially available regent, a potassium titanate ($K_2Ti_4O_9$) powder having an average particle size of 10 μm was pulverized in a bead mill until the average particle size reached 1 μm, and then the resulting powder was previously washed with pure water to remove impurities, which was added to a hydrochloric acid solution having a concentration of 1 M. The mixture was stirred for 240 hours to exchange potassium ions into protons. In this acid treatment, the hydrochloric acid solution was changed to a fresh hydrochloric acid solution every 24 hours so that the proton exchange was completely performed. The obtained proton-exchanged product ($H_2Ti_4O_9$) powder was washed with pure water, and dried with a freeze-dryer to recover it in a powder state. The powder was granulated to form 20 μm, on average, secondary particles. The particles were heated at 400° C. for 2 hours to obtain secondary particles of the monoclinic titanium dioxide ($TiO_2$ (B)).

Next, in order to synthesize $Li_4Ti_5O_{12}$, 100 ml of a sol-gel solution in which titanium tetraisopropoxide and lithium acetate were mixed in a molar ratio of Li:Ti of 4:5 was prepared. After the solution was diluted with isopropyl alcohol in 5 times, 10 g of the monoclinic titanium dioxide ($TiO_2$ (B)) was immersed in the solution to force the sol-gel solution to penetrate into the surface of the secondary particle of the monoclinic titanium dioxide. After that, the excessive sol-gel solution was separated by filtration, and then the particles were allowed to stand in the atmosphere for 12 hours. Subsequently, the particles were dried at 90° C. in a vacuum reduced pressure.

After the drying, the obtained particles were subjected to the powder X-ray diffraction and the electron beam diffraction according to TEM. As a result of the confirmation, it was found that there was an amorphous phase around the crystal of $TiO_2$ (B).

The particles were divided into 5 samples. The 5 samples were subjected to heating for 2 hours at a temperature of 300° C., 400° C., 550° C., 800° C., and 900° C. Thus, the composite oxide powders were obtained.

The obtained composite oxide powders were subjected to the powder X-ray diffraction measurement, the ICP measurement, the cross-sectional TEM observation of the particles using ion milling, and the electron beam diffraction measurement, as in Synthesis Example 1. The results obtained from these analyses are shown in Table 7 and Table 8 below.

TABLE 7

Synthesis Example 4

| Non-heating crystal phase | Heating condition (temperature) | | | | |
|---|---|---|---|---|---|
| | A. 300° C. | B. 400° C. | C. 550° C. | D. 800° C. | E. 900° C. |
| amorphous + $TiO_2(B)$ | $TiO_2(B)$ Strong (Comparative Example 23) | $TiO_2(B)$ Strong, LTO Weak (Example 14) | $TiO_2(B)$ Strong, LTO Weak (Example 15) | $TiO_2(B)$ Moderate, Anatase-type Weak, LTO Weak (Comparative Example 24) | Anatase-type Strong, LTO Moderate (Comparative Example 25) |

* $TiO_2$ (B): monoclinic titanium dioxide, LTO: spinel type lithium titanate, Anatase-type: anatase-type titanium dioxide "Strong," "Moderate" and "Weak" express a relative intensity of a peak belonging in each crystal phase in a powder X-ray diffraction chart of each sample.

TABLE 8

| | Structure |
|---|---|
| Example 14 | FIG. 5 |
| Example 15 | FIG. 5 |

As a results of these analyses, it was found that the samples of Examples 14 and 15 described in Table 7 had the same structure as that shown in FIG. 5. The samples of Examples 14 and 15, accordingly, contained the active material particles, which were the secondary particles containing the phase of the monoclinic titanium dioxide and the phase of the spinel type lithium titanate, in which a part of the phase of the spinel type lithium titanate was dispersed on the surface of active material particle. The active material particles of the samples of Examples 14 and 15, therefore, contained the core part 110 containing the monoclinic titanium dioxide, the intermediate part 120, which surrounded the core part 110, and contained the monoclinic titanium dioxide and the spinel type lithium titanate, and the shell part 130, which surrounded the intermediate part 120 and contained the spinel type lithium titanate.

On the other hand, the sample of Comparative Example 23 described in Table 7 did not contain the spinel type lithium titanate. The sample of Comparative Example 23, therefore, did not contain the intermediate part 120 and the shell part 130 described above.

The sample of Comparative Example 24 described in Table 7 did not contain the intermediate part 120 described above, but contained the anatase-type crystal phase, produced by the dehydration reaction of $TiO_2$ (B), instead of the intermediate part. There is the crystal phase containing the anatase-type titanium dioxide at the interface between the phase of the monoclinic titanium dioxide and the phase of the spinel type lithium titanate, and thus the phase of the monoclinic titanium dioxide is not brought into contact with the phase of the spinel type lithium titanate.

The sample of Comparative Example 25 described in Table 7 did not contain the monoclinic titanium dioxide. The sample of Comparative Example 25, accordingly, did not contain the core part 110 and the intermediate part 120 described above.

Comparative Synthesis Example 1

A commercially available regent, a potassium titanate ($K_2Ti_4O_9$) powder having an average particle size of 10 μm was prepared as in Synthesis Example 1. The prepared potassium titanate was one which had been previously washed with pure water to remove impurities from the potassium titanate. To 1 L of a hydrochloric acid solution having a concentration of 1 M was added 10 g of the potassium titanate prepared, and the mixture was stirred for 240 hours to exchange potassium ions into protons. In this acid treatment, the hydrochloric acid solution was changed to a fresh hydrochloric acid solution every 24 hours so that the proton exchange was completely performed. Thus, a proton-exchanged product ($H_2Ti_4O_9$) powder was obtained. The obtained proton-exchanged product was washed with pure water, and dried with a freeze-dryer to recover it in a powder state. The powder was heated at 400° C. for 2 hours.

The obtained powder after the heating was subjected to the powder X-ray diffraction measurement, and it was found that the powder was a monoclinic titanium dioxide ($TiO_2$ (B)) powder.

The monoclinic titanium dioxide (TiO2 (B)) powder obtained in Comparative Synthesis Example was used as a sample of Comparative Example 26.

Comparative Synthesis Example 2

To the sample of Comparative Example 26, the monoclinic titanium dioxide ($TiO_2$ (B)) was added 30% by weight of spinel type lithium titanate $Li_4Ti_5O_{12}$, and the mixture was mixed in a ball mill for one hour. The thus obtained mixture was observed by the SEM-EDX measurement, and it was found that the mixture was a mixture in which the monoclinic titanium dioxide ($TiO_2$ (B)) particles and the spinel type lithium titanate particles were uniformly mixed.

The mixture obtained in Comparative Synthesis Example 2 was used as a sample of Comparative Example 27.

The samples of Comparative Example 26 and Comparative Example 27 were subjected to each analysis in the same manner as in Synthesis Example 1. The results obtained from the analyses are shown in Table 9 below.

TABLE 9

| | Complexed state | Non-heated crystal phase | Peak in powder X-ray diffraction diagram |
|---|---|---|---|
| Comparative Synthesis Example 1 | None | Layered structure | TiO2(B) Strong (Comparative Example 26) |
| Comparative Synthesis Example 2 | Mixed state | TiO2 (B) + Anatase-type | — (Comparative Example 27) |

<Measurement of Solid Acid Site>

The solid acid points in the samples of Examples 1 to 15 were compared with the solid acid points in the sample of Comparative Example 26, i.e., the untreated monoclinic titanium dioxide ($TiO_2$ (B)) powder from the infrared absorption spectrum measurement according to the pyridine adsorption method. As a result, it was found that the number of solid acid points in the sample of each Example 1 to 15 was decreased compared to the number of solid acid points in the sample of Comparative Example 26.

<Electrochemical Measurement>

Using the samples of Examples 1 to 15 and Comparative Examples 1 to 27, an electrochemical measurement was performed in the following procedures.

First, acetylene black, as a conductive agent, was mixed with each sample of Examples and Comparative Examples in an amount of 10% by weight of the sample. Next, PVdF as a binder was dispersed in NMP, and the mixture was added to the sample in an amount of 10% by weight of the sample to obtain electrode slurry. The slurry was coated on a current collector formed of an aluminum foil in an amount of 30 g/m² using a blade. The obtained collector was rolled to adjust a density to 2.2 g/cm³, and then it was dried at 130° C. for 12 hours in vacuo to obtain an electrode for electrochemical measurement.

Using the resulting electrode, a metal lithium foil, as a counter electrode, and a nonaqueous electrolyte, a cell for electrochemical measurement was produced. As the nonaqueous electrolyte, 1 M of lithium hexafluorophosphate dissolved in a mixed solvent of ethylene carbonate and diethyl carbonate (a volume ratio of 1:1) was used.

Using the electrochemical dell, charge and discharge was performed at an hour discharge rate of 0.2 C, and an initial capacity and an initial efficiency were measured. Further, the discharge was increased to 0.2 C, 1.0 C, and 5.0 C, and a ratio of a discharge capacity at 5.0 C relative to the discharge rate at 0.2 C was examined. With respect to a repeated charge and discharge characteristic, charge and discharge was performed at 1.0 C in an environment of 25° C., and a capacity retention was examined after the charge and discharge was repeated 100 cycles. The measurement results are shown in Table 10 and Table 11 below.

TABLE 10

|  |  | Heat-treatment condition (temperature) | | | | |
| --- | --- | --- | --- | --- | --- | --- |
|  |  | A. 300° C. | B. 400° C. | C. 550° C. | D. 800° C. | E. 900° C. |
| Li exchange amount X | Synthesis Example 1-1 X = 0.08 | Comparative Example 1 183 mAh/g 0.59 47.1% | Comparative Example 2 214 mAh/g 0.68 65.3% | Example 1 221 mAh/g 0.78 78.8% | Comparative Example 3 198 mAh/g 0.76 72.7% | Comparative Example 4 165 mAh/g 0.56 38.1% |
|  | Synthesis Example 1-2 X = 0.14 | Comparative Example 5 186 mAh/g 0.55 45.1% | Comparative Example 6 212 mAh/g 0.70 67.2% | Example 2 230 mAh/g 0.81 80.1% | Comparative Example 7 200 mAh/g 0.77 73.8% | Comparative Example 8 163 mAh/g 0.53 36.3% |
|  | Synthesis Example 1-3 X = 0.33 | Comparative Example 9 182 mAh/g 0.60 43.3% | Example 3 219 mAh/g 0.76 77.4% | Example 4 228 mAh/g 0.88 92.1% | Example 5 211 mAh/g 0.86 95.8% | Comparative Example 10 168 mAh/g 0.62 45.9% |
|  | Synthesis Example 1-4 X = 0.42 | Comparative Example 11 178 mAh/g 0.58 44.0% | Example 6 209 mAh/g 0.73 80.4% | Example 7 210 mAh/g 0.86 93.1% | Example 8 207 mAh/g 0.85 96.8% | Comparative Example 12 165 mAh/g 0.78 89.6% |
|  | Synthesis Example 2-1 X = 0.35 | Comparative Example 13 209 mAh/g 0.78 44.0% | Example 9 242 mAh/g 0.82 78.9% | Example 10 258 mAh/g 0.89 89.4% | Comparative Example 14 172 mAh/g 0.75 88.6% | Comparative Example 15 171 mAh/g 0.75 87.7% |
|  | Synthesis Example 2-2 X = 0.86 | Comparative Example 16 165 mAh/g 0.82 41.0% | Example 11 201 mAh/g 0.80 79.5% | Comparative Example 17 171 mAh/g 0.74 87.6% | Comparative Example 18 173 mAh/g 0.75 86.1% | Comparative Example 19 172 mAh/g 0.77 88.4% |

*In each column, the first line: sample number; the second line: initial capacity; the third line: 5 C/0.2 C ratio; the fourth line: capacity retention.

TABLE 11

|  |  | Heating condition (temperature) | | | | |
| --- | --- | --- | --- | --- | --- | --- |
|  |  | A. 300° C. | B. 400° C. | C. 550° C. | D. 800° C. | E. 900° C. |
| Amount of LTO to $TiO_2(B)$ | Synthesis Example 3 26.5 wt % | Comparative Example 20 167 mAh/g 0.79 38.3% | Example 12 210 mAh/g 0.78 81.1% | Example 13 212 mAh/g 0.84 89.1% | Comparative Example 21 158 mAh/g 0.67 67.1% | Comparative Example 22 154 mAh/g 0.63 63.8% |
|  | Synthesis Example 4 17.2 wt % | Comparative Example 23 189 mAh/g 0.71 58.3% | Example 14 220 mAh/g 0.74 71.1% | Example 15 218 mAh/g 0.71 68.1% | Comparative Example 24 168 mAh/g 0.66 57.4% | Comparative Example 25 163 mAh/g 0.60 47.4% |
|  | Untreated $TiO_2(B)$ |  | Comparative Example 26 224 mAh/g 0.56 48.0% |  |  |  |
| Amount of LTO to $TiO_2(B)$ | Comparative Synthesis Example 2 30.0 wt % |  | Comparative Example 27 207 mAh/g 0.68 58.0% |  |  |  |

* In each column, the first line: sample number; the second line: initial capacity; the third line: 5 C/0.2 C; the fourth line: capacity retention.

From the results shown in Table 10 and Table 11, it is found that the samples of Examples 1 to 15 showed capacities higher than those of the samples of Comparative Examples 12, 14, 15, and 17 to 19 which contained only the spinel type lithium titanate. In addition, it is found that the samples of Examples 1 to 15 showed the capacity retentions more excellent than those of the samples of Comparative Examples 1, 2, 5, 6, 9, 11, 13, 16, 20 and 23 which contained only the monoclinic titanium dioxide ($TiO_2$ (B)). It was found that in the samples of Examples 1 to 15, accordingly, the reaction of the solid acid points in the monoclinic titanium dioxide with the electrolytic solution can be suppressed, and owing to this, they can realize a nonaqueous electrolyte battery capable of showing the battery capacity and cycle life.

The sample of Comparative Example 27 had the capacity retention inferior to those of the samples of Examples 1 to 15. It is considered that the sample of Comparative Example 27 contained the active material particles formed by uniformly mixing the monoclinic titanium dioxide with the spinel type lithium titanate, and the active material particles could not suppress the reaction of the solid acid points in the monoclinic titanium dioxide with the nonaqueous electrolyte, whereby the above phenomenon happened.

In the cells for electrochemical measurement produced using the samples of Examples and Comparative Examples, the lithium metal is used as a counter electrode, and the potentials of the electrodes produced using the samples of Examples and Comparative Examples are nobler than that of the counter electrode. For that reason, the electrodes produced using the samples of Examples and Comparative Examples act as the positive electrode in the cells for electrochemical measurement. Here, to avoid confusion, in Examples described above, a direction in which lithium ions are inserted into the electrodes produced using the samples of Examples and Comparative Examples is called as "charge" and a direction in which lithium ions are extracted is called as "discharge," consistently.

On the other hand, the electrodes produced using the samples of Examples and Comparative Examples can act as the negative electrode in a battery produced by combining with known positive electrode materials. In the battery produced as described above, a direction in which lithium ions are inserted into the negative electrodes produced using the samples of Examples and Comparative Examples is a discharge direction, and a direction in which lithium ions are extracted is a charge direction.

According to at least one of embodiments and Examples described above, therefore, the shell part formed by dispersing at least a part of the phase of the spinel type lithium titanate on the surface of the active material particle can prevent the contact of the solid acid points in the monoclinic titanium dioxide with the nonaqueous electrolyte. Owing to this, the electrode material for a battery according to the first embodiment can realize the nonaqueous electrolyte battery capable of showing the excellent battery capacity and cycle life.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode material comprising:
   active material particles comprising
   a phase of monoclinic titanium dioxide; and
   a phase of spinel type lithium titanate;
   wherein the active material particle comprises
   a shell part formed by dispersing at least a part of the phase of the spinel type lithium titanate on a surface of the active material particle, and
   a core part which contains a part of the phase of the monoclinic titanium dioxide and is surrounded by the shell part,
   wherein the active material particle further comprises an intermediate part located between the core part and the shell part,
   the intermediate part contains another part of the phase of the monoclinic titanium dioxide and another part of the phase of the spinel type lithium titanate, and
   a crystal lattice of the monoclinic titanium dioxide and a crystal lattice of the spinel type lithium titanate interpenetrate in the intermediate part.

2. The electrode material according to claim 1, wherein the shell part contains another part of the phase of the monoclinic titanium dioxide, solid acid points of the another part of the phase of the monoclinic titanium dioxide are neutralized by the phase of the spinel type lithium titanate.

3. The electrode material according to claim 1, wherein the shell part contains no monoclinic titanium dioxide.

4. The electrode material according to claim 1, which contains the shell part in a ratio of 1% by mass to 50% by mass relative to a mass of the electrode material.

5. The electrode material according to claim 1, wherein an area in the intermediate part adjacent to the shell part has a concentration of the spinel type lithium titanate higher than a concentration of the spinel type lithium titanate of an area in the intermediate part adjacent to the core part.

6. The electrode material according to claim 1, wherein the active material particle is a primary particle or a secondary particle.

7. A nonaqueous electrolyte battery comprising:
   a negative electrode comprising the electrode material according to claim 1;
   a positive electrode; and
   a nonaqueous electrolyte.

8. A battery pack comprising the nonaqueous electrolyte battery according to claim 7.

9. The battery pack according to claim 8, further comprising:
   a power distribution external terminal; and
   a protective circuit.

10. A battery pack comprising nonaqueous electrolyte batteries, each of the nonaqueous electrolyte batteries comprising:
    a negative electrode comprising the electrode material according to claim 1;
    a positive electrode; and
    a nonaqueous electrolyte;
    wherein the nonaqueous electrolyte batteries are electrically connected in series, in parallel, or with a combination of series connection and parallel connection.

11. A vehicle comprising the battery pack according to claim 8.

12. The vehicle according to claim 11, wherein the battery pack is configured to recover a regenerative energy caused by a power of the vehicle.

* * * * *